(12) United States Patent
Cha et al.

(10) Patent No.: US 12,164,123 B2
(45) Date of Patent: Dec. 10, 2024

(54) OPTICAL SHEET AND DISPLAY DEVICE COMPRISING SAME

(71) Applicant: SK MICROWORKS SOLUTIONS CO., LTD., Cheonan-si (KR)

(72) Inventors: Hyo Gil Cha, Seoul (KR); Yong Jae Choe, Osan-si (KR); Tae Hoon Kim, Yongin-si (KR); Kyoo Choong Cho, Hanam-si (KR)

(73) Assignee: SK MICROWORKS SOLUTIONS CO., LTD., Cheonan-si (KR)

( * ) Notice: Subject to any disclaimer, the term of this patent is extended or adjusted under 35 U.S.C. 154(b) by 564 days.

(21) Appl. No.: 17/330,566

(22) Filed: May 26, 2021

(65) Prior Publication Data

US 2022/0099869 A1 Mar. 31, 2022

(30) Foreign Application Priority Data

Sep. 29, 2020 (KR) .................. 10-2020-0127104
Dec. 7, 2020 (KR) .................. 10-2020-0169528

(51) Int. Cl.
| | |
|---|---|
| *G02B 5/04* | (2006.01) |
| *C09D 5/32* | (2006.01) |
| *C09D 7/48* | (2018.01) |
| *C09D 7/63* | (2018.01) |
| *G02B 5/00* | (2006.01) |
| *G02B 5/20* | (2006.01) |
| *G02B 5/30* | (2006.01) |

(52) U.S. Cl.
CPC .............. *G02B 5/045* (2013.01); *C09D 5/32* (2013.01); *C09D 7/48* (2018.01); *C09D 7/63* (2018.01); *G02B 5/003* (2013.01); *G02B 5/208* (2013.01); *G02B 5/3033* (2013.01)

(58) Field of Classification Search
CPC ........ G02B 5/045; G02B 5/003; G02B 5/208; G02B 5/3033; C09D 7/48; C09D 7/63; C09D 5/32
See application file for complete search history.

(56) References Cited

U.S. PATENT DOCUMENTS

| | | | |
|---|---|---|---|
| 3,830,682 A | 8/1974 | Rowland | |
| 2007/0285248 A1* | 12/2007 | Hamel | G06K 19/0701 340/572.1 |
| 2008/0310171 A1* | 12/2008 | Hiraishi | G02B 5/0231 362/339 |
| 2009/0091937 A1 | 4/2009 | Chiang | |

(Continued)

FOREIGN PATENT DOCUMENTS

| | | |
|---|---|---|
| CN | 107272254 A | 10/2017 |
| JP | 2010-20211 A | 1/2010 |

(Continued)

*Primary Examiner* — Nathanael R Briggs
(74) *Attorney, Agent, or Firm* — Sughrue Mion, PLLC

(57) ABSTRACT

In the optical sheet according to an embodiment, at least one organic dye that selectively absorbs light in a specific wavelength band is added to a prism pattern layer, whereby it is possible to provide an optical sheet by a simpler manufacturing process than before, in which the color gamut is enhanced while a decrease in luminance due to light absorption is minimized. In addition, it is possible to secure optical and mechanical properties while preventing a degradation of organic dyes due to UV curing by adjusting the composition of the prism pattern layer.

15 Claims, 17 Drawing Sheets

(56) References Cited

U.S. PATENT DOCUMENTS

2016/0320532 A1\* 11/2016 Purchase ................. F21V 7/00
2017/0285248 A1 10/2017 Cho et al.

FOREIGN PATENT DOCUMENTS

| | | | |
|---|---|---|---|
| JP | 2010-077251 | A | 4/2010 |
| JP | 2010134349 | A  \* | 6/2010 |
| KR | 10-2008-0110357 | A | 12/2008 |
| KR | 10-2012-0072194 | A | 7/2012 |
| KR | 10-1332167 | B1 | 11/2013 |
| KR | 10-1799975 | B1 | 11/2017 |
| KR | 10-2018-0006121 | A | 1/2018 |
| KR | 10-1930546 | B1 | 12/2018 |
| KR | 10-2162846 | B1 | 10/2020 |
| WO | 2010/058702 | A1 | 5/2010 |
| WO | 2016/068409 | A1 | 5/2016 |

\* cited by examiner

OPTICAL SHEET AND DISPLAY DEVICE COMPRISING SAME

TECHNICAL FIELD

Embodiments relate to an optical sheet having enhanced color gamut and luminance and to a display device comprising the same.

BACKGROUND ART

In the past, 40-inch (") TVs were the mainstream, but now a lot of consumers would buy 50" TVs and even 60" TVs. As such size competition has ended, the resolution competition has begun. A year ago, full high definition (FHD) TVs were a high-end model, but now ultra-high definition (UHD) TVs have spread rapidly in the market.

In recent years, the field of display devices is evolving from competition in the increased area and high resolution to competition in color. For this reason, competition for manufacturing display devices having excellent color has recently emerged.

A liquid crystal display (LCD) device displays an image by using the optical properties of liquid crystals. Since a liquid crystal display panel that displays an image is a non-light-emitting device that does not emit light by itself, it has a structure comprising a liquid crystal display panel and a backlight unit that is disposed on the rear side thereof and supplies light to the liquid crystal display panel. A liquid crystal display device has advantages in that it is thinner and lighter in weight, consumes a low power, and requires a low driving voltage as compared with other display devices, whereas it is somewhat inferior to other display devices from the viewpoint of color.

In addition, cathode ray tube (CRT) display devices, which are disappearing now, have a color gamut of up to 80% based on the National Television Standards Committee (NTSC), and plasma display panel (PDP) devices having an NTSC level of 90% also have been marketed until recently. In addition, organic light-emitting display (OLED) devices, which are in the spotlight as a next-generation display device, can achieve an NTSC level of up to 100%. However, LCD TVs have an NTSC level of 72%.

Accordingly, in order to activate the market in the display device field, there is a demand for a technology that improves the disadvantages of liquid crystal display devices, thereby enhancing the conventional color gamut and does not deteriorate the luminance thereof.

PRIOR ART DOCUMENT (Patent Document 1) Korean Laid-open Patent Publication No. 2012-0072194

DISCLOSURE OF INVENTION

Technical Problem

An optical sheet adopted in the backlight unit of a display device performs such functions as collecting, diffusing, and reflecting light. When two or more functions are combined, individual optical functions can be complemented and maximized. In addition, a filter layer that blocks unnecessary wavelengths other than RGB may be combined with an optical sheet to enhance the color gamut. Conventionally, however, there has been a problem in that the manufacturing process becomes complicated in the course of introducing such an additional filter layer and that the overall thickness is increased or the luminance is decreased.

As a result of research conducted by the present inventors, at least one organic dye that selectively absorbs light in a specific wavelength band is added to a prism pattern layer, whereby it is possible to enhance the color gamut even in a simpler manufacturing process than before, while minimizing a decrease in luminance due to light absorption. In addition, the present inventors have been able to secure optical and mechanical properties while preventing a degradation of organic dyes due to UV curing by adjusting the composition of the prism pattern layer.

Accordingly, an object of the embodiments is to provide an optical sheet having excellent luminance and processibility while enhancing the color gamut, a process for preparing the same, and a display device comprising the same.

Solution to Problem

According to an embodiment, there is provided an optical sheet, which comprises a base layer; and a prism sheet comprising a prism pattern layer disposed on the base layer, wherein the prism pattern layer comprises a light absorber that selectively absorbs light in a specific wavelength band, and the light absorber comprises at least one organic dye.

According to another embodiment, there is provided an optical sheet, which comprises a base layer; a prism sheet comprising a prism pattern layer disposed on the base layer; and a light diffusion layer disposed under the prism sheet, wherein the prism pattern layer comprises a light absorber that selectively absorbs light in a specific wavelength band.

According to another embodiment, there is provided a process for preparing an optical sheet, which comprises coating a composition for forming a prism pattern on the upper side of a base layer, transferring a pattern, and then UV curing the composition to form a prism pattern layer, wherein the composition for forming a prism pattern comprises a binder resin, a light absorber, a UV blocking agent, an antioxidant, and a light stabilizer, and the light absorber comprises at least one organic dye that selectively absorbs light in a specific wavelength band.

According to another embodiment, there is provided a display device, which comprises a light source; a display panel that receives light from the light source and displays an image; and an optical sheet disposed in an optical path from the light source to the display panel.

Advantageous Effects of Invention

In the optical sheet according to an embodiment, at least one organic dye that selectively absorbs light in a specific wavelength band is added to a prism pattern layer, whereby it is possible to provide an optical sheet by a simpler manufacturing process than before in which the color gamut is enhanced while a decrease in luminance due to light absorption is minimized.

According to a preferred embodiment, it is possible to secure optical and mechanical properties while preventing a degradation of organic dyes due to UV curing by adjusting the composition of the prism pattern layer.

Accordingly, the optical sheet according to an embodiment may be applied to a backlight unit of a display device such as an LCD to enhance its performance.

EXPLANATION OF REFERENCE NUMERALS

Figure 1:
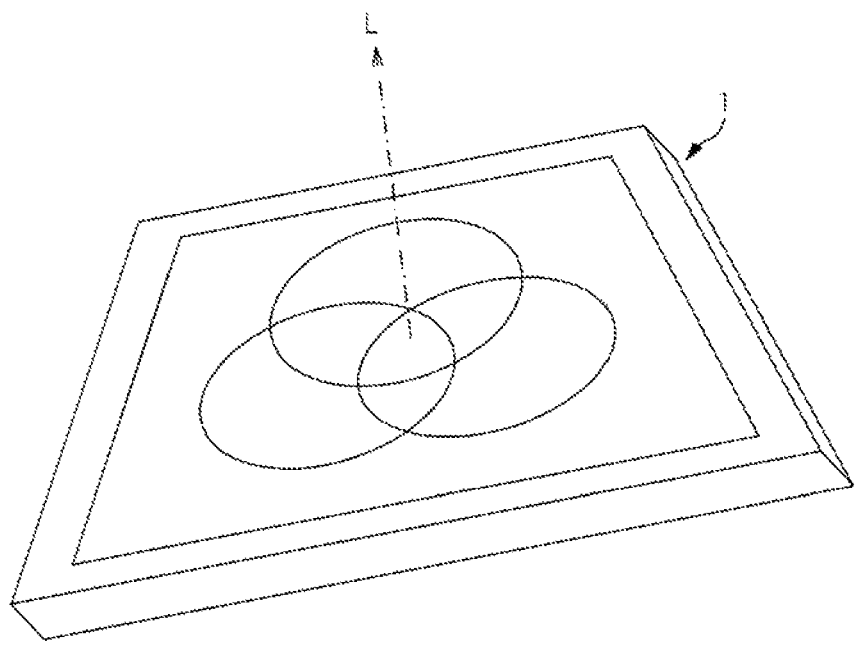
FIG. 1 shows a display device according to an embodiment and a traveling direction of light.

1: display device
2-1: first unwinding roll
2-2: second unwinding roll
3-1: first curing device
3-2: second curing device
4: pattern roll
5-1: first curing device
5-2: second curing device
6: pressing roll
10: backlight unit
11: optical sheet
20: display panel
30: cover window
51: upper frame
52: lower frame
200: prism sheet
201: base layer
202: prism pattern layer
202': composition for a prism pattern layer
202a: first pattern
202b: second pattern
210: first prism sheet
220: second prism sheet
211: first base layer
212: first prism pattern layer
221: second base layer
222: second prism pattern layer
310: first functional coating layer
320: second functional coating layer
311: bead
312: binder resin
321: bead
322: binder resin
350: base film
400: reflective polarizing film
500: cushioning film
600, 610, 620, 630: adhesive layer
601: meniscus
700: light guide plate
800: reflector
L: emitting light
UV: UV light
M: laminate
S1, S2: skin layer
T1: thickness of a base layer
T2: thickness of a pattern layer
Ta: height of a first pattern
Tb: height of a second pattern
CG: full color gamut
CG0: overlapping color gamut
CG1: first color gamut
CG2: second color gamut
R: red
G: green
B: blue

BEST MODE FOR CARRYING OUT THE INVENTION

In the following description of the embodiments, in the case where an element is mentioned to be formed "on" or "under" another element, it means not only that one element is directly formed "on" or "under" another element, but also that one element is indirectly formed on or under another element with other element(s) interposed between them.

In addition, the term on or under with respect to each element may be referenced to the drawings. For the sake of description, the sizes of individual elements in the appended drawings may be exaggeratedly depicted, and they may differ from the actual sizes.

Throughout the present specification, when a part is referred to as "comprising" an element, it is understood that other elements may be comprised, rather than other elements are excluded, unless specifically stated otherwise.

In addition, all numbers expressing the physical properties, dimensions, and the like of elements used herein are to be understood as being modified by the term "about" unless otherwise indicated.

In the present specification, a singular expression is understood to encompass a singular or plural expression, interpreted in context, unless otherwise specified.

Display Device

The display device according to an embodiment comprises a light source, a display panel, and an optical sheet. The display panel receives light from the light source and displays an image. The optical sheet is disposed in an optical path from the light source to the display panel. Thus, the display device may comprise a light source; an optical sheet on which light from the light source is incident; and a display panel on which light from the optical sheet is incident. As light from the light source passes through the optical sheet, its characteristics are enhanced, and the display panel displays an image using the light having the enhanced characteristics. As a result, referring to FIG. 1, an image viewed through light (L) emitted from the screen of a display device (1) may be recognized to have an excellent color.

Figure 3:
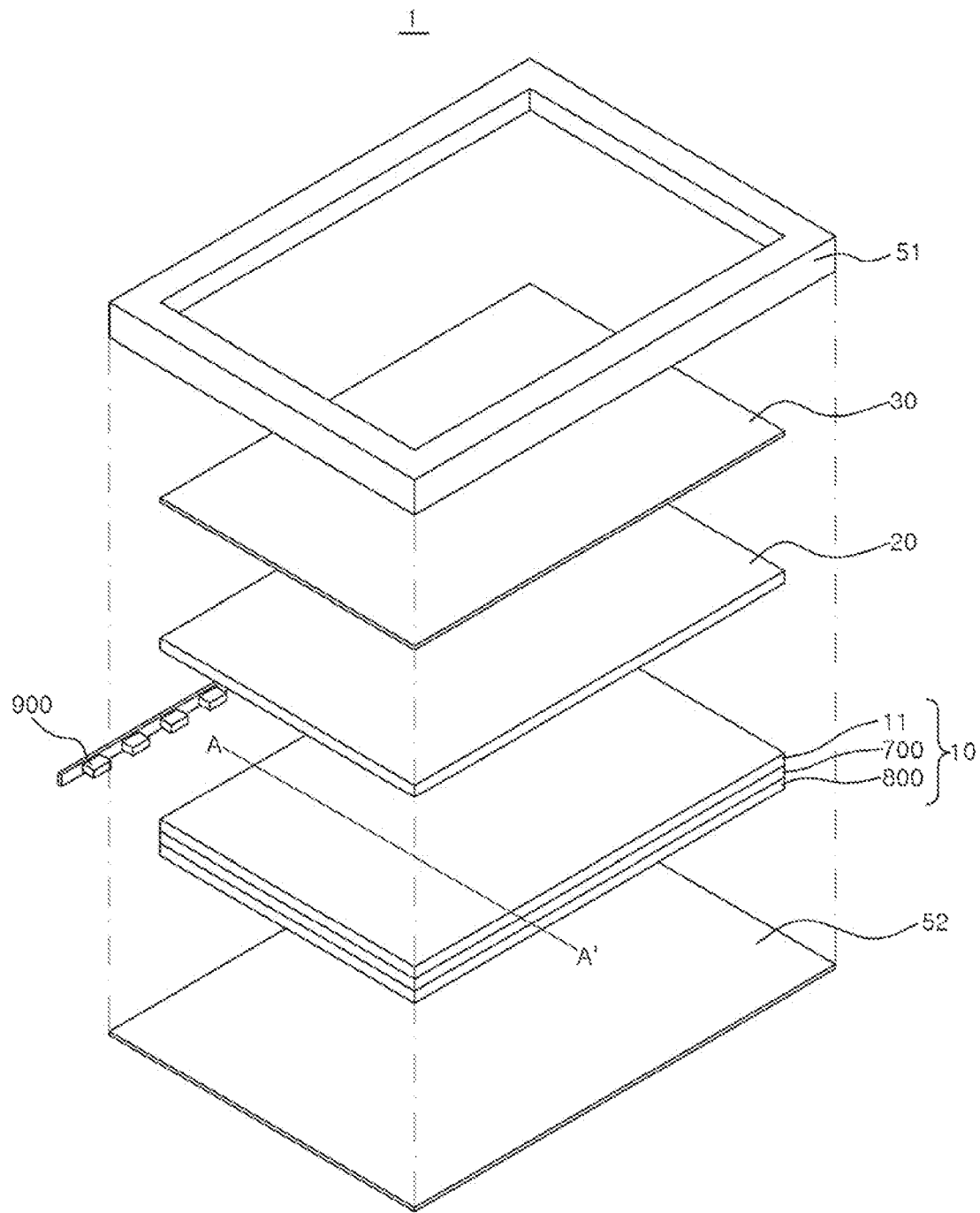
FIG. 3 shows an exploded perspective view of a display device according to an embodiment.

Specifically, referring to FIG. 3, the display device (1) may comprise a backlight unit (10); and a display panel (20) disposed on the backlight unit (10). The backlight unit (10) may comprise an optical sheet (11); and a diffusion plate or a light guide plate (700), and it may further comprise a light source (900).

The light source may be disposed on a side of the light guide plate or under the diffusion plate. The diffusion plate or light guide plate (700) is disposed under the optical sheet (11) and serves to transmit light generated from the light source (900) to the display panel (20). The light guide plate (700) is used in the case of an edge-type light source in which case a reflector (800) is disposed under the light guide plate (700) to reduce light loss. The diffusion plate is used in the case of a direct light source, and an LED surface light source is used to enhance light efficiency.

Referring to FIG. 3, light generated from the light source (900) is incident on the side of the light guide plate (700) and is reflected by the reflector (800) to enter the bottom of the optical sheet (11). The light incident in such a way passes through the optical sheet (11) vertically and is emitted from the top thereof. The light emitted from the top of the optical sheet (11) is incident on the display panel (20). As a result, an image may be displayed on the screen of the display panel.

The light source may be a white light source. For example, the light source may have a continuous emission spectrum. Specifically, the light source may be a white LED. More specifically, the light source may comprise a blue gallium nitride (GaN) light-emitting chip and a yellow yttrium aluminum garnet (YAG, $Y_3Al_5O_{12}$) phosphor. In addition, the light source may comprise a blue gallium nitride (GaN) light-emitting chip and an r, g phosphor or may comprise an r phosphor and a red KSF ($K_2SiF_6$:Mn) phosphor.

The display panel (20) may comprise a liquid crystal cell and one or more polarizing plates. As a specific example, the display panel (20) may have a structure in which a first polarizing plate, a liquid crystal cell, and a second polarizing plate are stacked in which an adhesive layer may be formed between the polarizing plates and the liquid crystal cell.

The display device (1) may further comprise a cover window (30) disposed on the display panel (20), and the cover window may be formed of a transparent polyimide film or ultra-thin glass (UTG). In addition, the display device (1) may further comprise an electrode and a substrate connected to the display panel (20). In addition, the liquid crystal display (1) may comprise frames (51, 52) surrounding and protecting these components.

Components of the Optical Sheet

The optical sheet according to an embodiment comprises a base layer; and a prism sheet comprising a prism pattern layer disposed on the base layer, wherein the prism pattern layer comprises a light absorber that selectively absorbs light in a specific wavelength band, and the light absorber comprises at least one organic dye.

The optical sheet according to another embodiment comprises a base layer; a prism sheet comprising a prism pattern layer disposed on the base layer; and a light diffusion layer disposed under the prism sheet, wherein the prism pattern layer comprises a light absorber that selectively absorbs light in a specific wavelength band.

As such, the optical sheet comprises at least one prism sheet. In addition, the optical sheet comprises a light absorber in the prism pattern layer of the at least one prism sheet. The prism sheet may be disposed in an optical path from the light source to the display panel.

In addition, the optical sheet may further comprise a base film, a reflective polarizing film, a cushioning film, a functional coating layer, and an adhesive layer.

Hereinafter, each constitutional element will be described in detail.

Prism Sheet

The prism sheet serves to enhance luminance through collecting light by virtue of a difference in refractive index at the interface of the prism pattern.

Figure 10A:
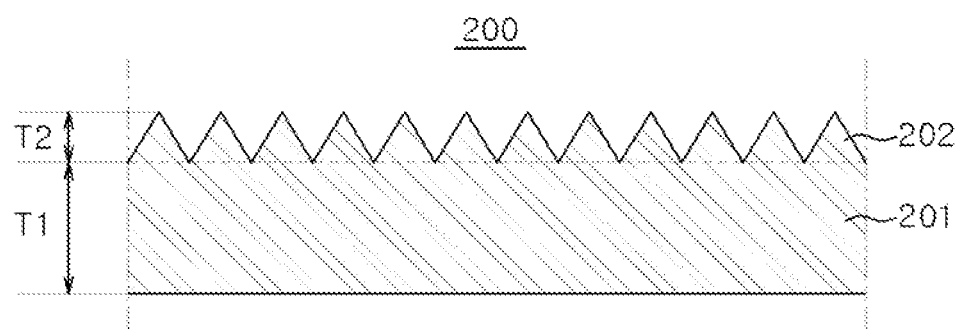
FIGS. 10a to 10c are cross-sectional views of a prism sheet employed in an optical sheet according to an embodiment.

Referring to FIG. 10a, the prism sheet (200) comprises a base layer (201) and a prism pattern layer (202) formed on the base layer. The pattern shape of the pattern layer is not particularly limited. For example, it may have a long triangular pillar shape, thereby refracting light at the interface.

Figure 10B:
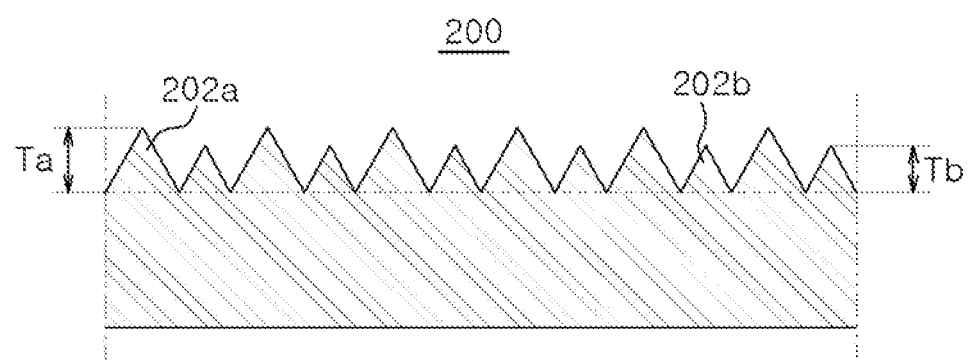

The prism sheet may comprise a plurality of prism patterns having different heights. Referring to FIG. 10b, the prism pattern may be composed of a first pattern (202a) and a second pattern (202b) having different heights. The ratio (Tb/Ta) of the height (Tb) of the second pattern to the height (Ta) of the first pattern may be 0.5 to 0.99 or 0.8 to 0.95.

Figure 10C:
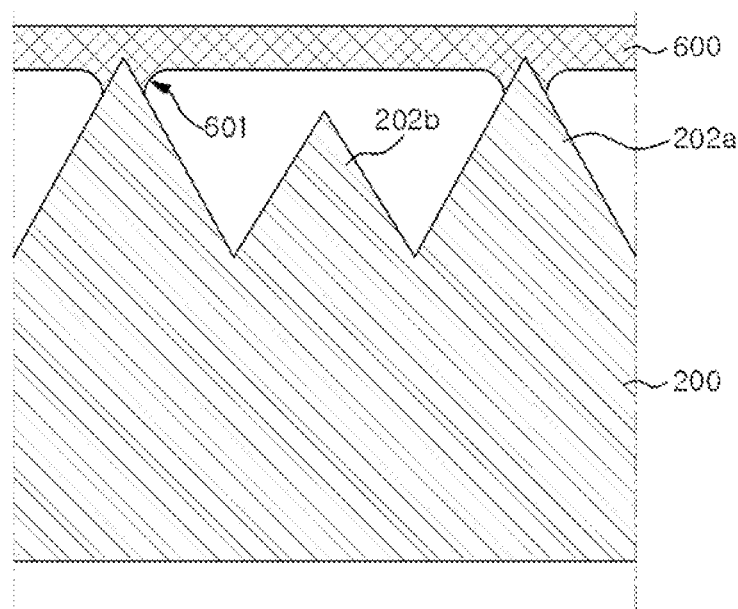

Referring to FIG. 10c, the vertex at the top end of the first pattern (202a) penetrates into an adhesive layer (600) and adheres thereto. In such event, a meniscus (601) is formed, thereby deteriorating the light collecting performance. Thus, the height of the second pattern (202b) is made to differ from that of the first pattern to preserve the shape of the top end, whereby it is possible to suppress a deterioration in the light collecting performance.

The base layer and the pattern layer may be formed of the same material as each other. For example, the base layer and the pattern layer may be integrally prepared. Alternatively, the base layer and the pattern layer may be formed of different materials. For example, once a base layer has been prepared, a pattern layer may be formed thereon.

Specifically, examples of the material for the base layer include polyester resins, polyethersulfone resins, acrylic resins, polyetherimide resins, polyphenylene sulfide resins, polyarylate resins, polyimide resins, polycarbonate resins, cellulose triacetate resins, cellulose acetate propionate resins, and the like. More specifically, the material for the base layer may be a polyester resin, particularly a polyethylene terephthalate resin or a polyethylene naphthalate resin.

In addition, the material for the pattern layer may be a UV curable resin. Examples thereof include an acrylate resin such as an epoxy acrylate and a urethane acrylate, a methacrylate resin, and an epoxy resin.

Referring to FIG. 10a, the thickness (T1) of the base layer of the prism sheet may be 30 μm to 300 μm, specifically, 50 μm to 200 μm, and the thickness (T2) of the pattern layer may be 10 μm to 100 μm, specifically, 20 μm to 60 μm.

Figure 8:
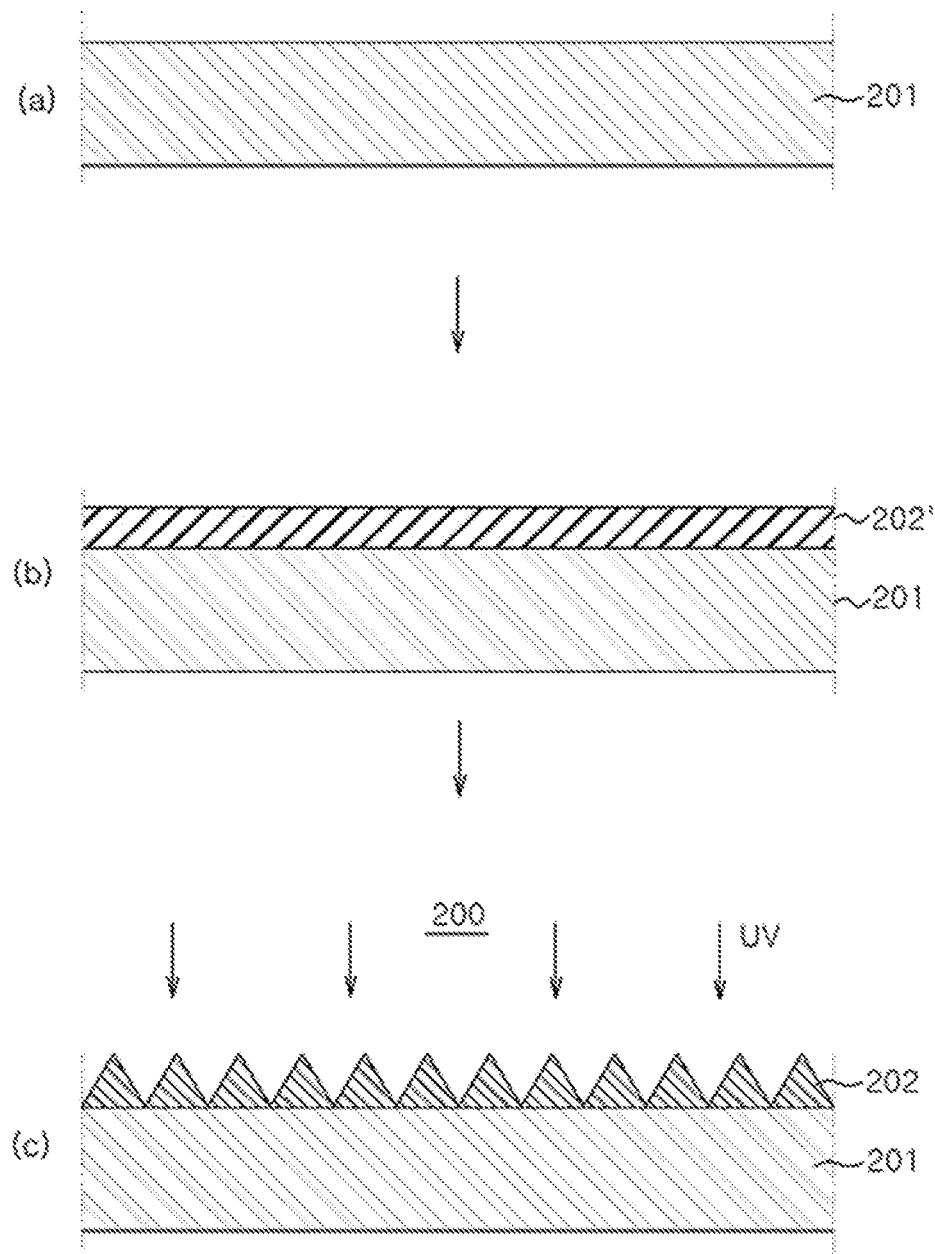
FIG. 8 shows a process of preparing an optical sheet according to an embodiment.

Composition and Characteristics of the Prism Pattern Layer (c) of FIG. 8 is a cross-sectional view of a prism pattern layer contained in an optical sheet according to an embodiment. Referring to (c) of FIG. 8, the prism pattern layer (202) comprises a light absorber and a binder resin.

The light absorber selectively absorbs light in a specific wavelength band. The light absorber may have a main absorption wavelength within a visible light wavelength band. However, the main absorption wavelength of the light absorber may belong to a band excluding a pure RGB wavelength within a visible light wavelength band. For example, the main absorption wavelength of the light absorber may fall within 470 nm to 520 nm or 550 nm to 620 nm. Specifically, the main absorption wavelength of the light absorber may fall within 480 nm to 510 nm, 560 nm to 610 nm, or 580 nm to 620 nm.

The light absorber comprises at least one organic dye. The organic dye selectively absorbs light in a specific wavelength band. Specifically, the organic dye may have a chromophore that selectively absorbs light in a specific wavelength band. In particular, since the organic dye has an unsaturated bond (e.g., a conjugated bond) such as a double bond, it can selectively absorb light in a specific wavelength band.

As a specific example, the light absorber may comprise at least one organic dye selected from the group consisting of pyrrolemethines, rhodamines, borondipyrromethenes, tetraazaporphyrins, squarines, and cyanines.

The organic dye having an unsaturated bond as described above is mainly added to a conventional coating layer or a thermosetting resin layer since a radical reaction takes place by UV light, whereby its activity is liable to decrease. Meanwhile, in order to form a prism pattern and maintain the pattern shape even at the time of adhesion with an adjacent layer, it is required to achieve a certain level of strength through UV curing. Thus, conventionally, it was difficult to add a light absorber to a prism pattern layer. According to the present invention, however, it is possible to form a prism pattern layer securing optical/mechanical properties while preventing a decrease in the activity of the light absorber according to UV curing by way of controlling the composition and content of the components added to a prism pattern layer. Accordingly, since there is no need to prepare a separate coating layer for introducing a light absorbing layer, and there is no need for an additional aging step accordingly, the process can be simplified and the productivity can be enhanced.

For example, the content of the light absorber may be 0.01% by weight to 10% by weight, for example, 0.01% by weight to 7% by weight, 0.01% by weight to 5% by weight, or 0.01% by weight to 3% by weight, based on the total weight of the prism pattern layer. Specifically, the light absorber may be employed in an amount of 0.01% by weight to 1% by weight based on the total weight of the prism pattern layer. In addition, the content of the light absorber may be 0.01 part by weight or more, 0.015 part by weight or more, 0.02 part by weight or more, 0.025 part by weight or more, 0.03 part by weight or more, 0.035 part by weight or more, or 0.04 part by weight or more, and 1 part by weight or less, 0.5 part by weight or less, 0.1 part by weight or less, 0.05 part by weight or less, 0.045 part by weight or less, 0.04 part by weight or less, 0.035 part by weight or less, 0.03 part by weight or less, or 0.025 part by weight or less, based on 100 parts by weight of the binder resin contained in the prism pattern layer.

The binder resin may be composed of a component suitable for coating and pattern formation, for example, a UV curable resin as exemplified above. Specifically, the binder resin may be at least one selected from the group consisting of epoxy acrylate, urethane acrylate, polyester acrylate, acrylic acrylate, silicone acrylate, polybutadiene acrylate, melamine acrylate, epoxy-modified acrylate, and urethane-modified acrylate.

The prism pattern layer may further comprise at least one of a UV blocking agent, an antioxidant, and a light stabilizer.

For example, the UV blocking agent may be at least one selected from the group consisting of hydroxybenzotriazole-based, tris-resorcinol-triazine chromophore-based, and hydroxyphenyl-benzotriazole chromophore-based UV blocking agents.

In addition, the antioxidant may be at least one selected from the group consisting of amine-based, phenol-based, sulfur-based, phosphine-based, phosphite-based, and thioester-based antioxidants.

In addition, the light stabilizer may be at least one selected from the group consisting of a hindered amine light stabilizer (HALS)-based, benzotriazole-based, and benzophenol-based light stabilizer.

The weight of the UV blocking agent contained in the prism pattern layer may be 10 times or more, 20 times or more, or 30 times or more, and 100 times or less, 70 times or less, or 50 times or less, relative to the weight of the light absorber. Specifically, the weight of the UV blocking agent may be 10 times to 100 times the weight of the light absorber.

The weight of the antioxidant contained in the prism pattern layer may be 0.5 time or more, 1 time or more, 2 times or more, 10 times or more, or 30 times or more, and 100 times or less, 10 times or less, 7 times or less, or 5 times or less, relative to the weight of the light absorber. Specifically, the weight of the antioxidant may be 1 time to 10 times the weight of the light absorber.

The weight of the light stabilizer contained in the prism pattern layer may be 0.2 time or more, 0.5 time or more, 1 time or more, 5 times or more, or 10 times or more, and 50 times or less, 30 times or less, 20 times or less, 10 times or less, or 5 times or less, relative to the weight of the light absorber. Specifically, the weight of the light stabilizer may be 10 times to 50 times the weight of the light absorber.

In addition, the prism pattern layer may further comprise a photoinitiator, specifically, at least one selected from the group consisting of (2,4,6-trimethylbenzoyl)diphenylphosphine, hydroxydimethylacetophenone, and methylbenzoylformate. The weight of the photoinitiator contained in the prism pattern layer may be 0.1 part by weight to 1 part by weight based on 100 parts by weight of the binder resin.

Characteristics of the Prism Pattern Layer

The prism pattern layer selectively absorbs light in a specific wavelength band thanks to a light absorber contained therein.

The prism pattern layer may have a main absorption wavelength within a visible light wavelength band. However, the main absorption wavelength of the prism pattern layer may belong to a band excluding a pure RGB wavelength within a visible light wavelength band. Accordingly, the prism pattern layer may enhance a color gamut by blocking unnecessary wavelengths other than pure RGB wavelengths emitted from the light source. For example, the main absorption wavelength of the prism pattern layer may fall within 470 nm to 520 nm or 550 nm to 620 nm. Specifically, the main absorption wavelength of the prism pattern layer may fall within 480 nm to 510 nm, 560 nm to 610 nm, or 580 nm to 620 nm.

In addition, the prism pattern layer may further have a supplementary absorption wavelength having a lower absorption rate than that of the main absorption wavelength. The supplementary absorption wavelength may also fall within a visible light wavelength band. For example, the supplementary absorption wavelength of the light absorber may belong to a band excluding a pure RGB wavelength within a visible light wavelength band. Alternatively, the supplementary absorption wavelength may belong to a pure RGB wavelength band unlike the main absorption wavelength. For example, the supplementary absorption wavelength may belong to 510 nm to 560 nm or 530 nm to 570 nm.

As a specific example, the prism pattern layer may have a main absorption wavelength at 580 nm to 620 nm and a supplementary absorption wavelength at 530 nm to 570 nm. Within the above ranges, the color gamut can be enhanced more effectively.

The prism pattern layer may have an ultraviolet transmittance within a certain range. For example, the transmittance of the prism pattern layer for UV-A light may be 10% or more, 20% or more, or 30% or more, and 80% or less, 70% or less, 60% or less, or 50% or less. As a specific example, the prism pattern layer may have a transmittance of 10% to 70% for UV-A light.

In addition, the prism pattern layer may have a visible light transmittance within a certain range. For example, the prism pattern layer may have a light transmittance of 30% or more, 45% or more, 50% or more, or 70% or more, specifically, 30% to 90% or 50% to 90%, for a wavelength of 590 nm.

Type and Composition of the Functional Coating Layer

The optical sheet may further comprise one, two, or more functional coating layers.

The functional coating layer may be, for example, a light diffusion layer, a grinding prevention layer, a hard coating layer, a heat-resistant coating layer, or the like.

Figure 4:
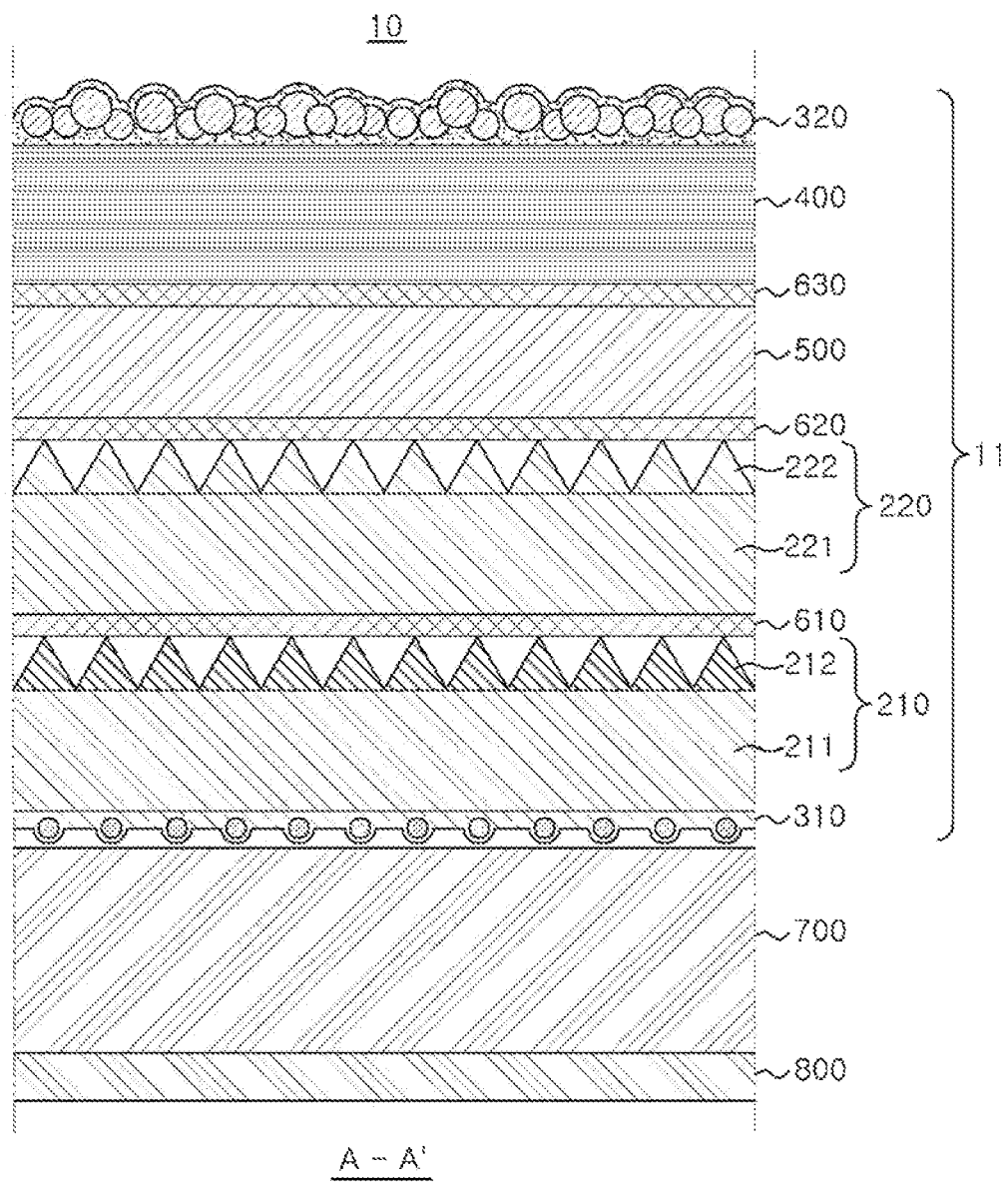
FIG. 4 shows a cross-sectional view of a backlight unit according to an embodiment.

Referring to FIG. 4, a first functional coating layer (310) may be formed in the lower part of the optical sheet (11), and a second functional coating layer (320) may be formed in the upper part of the optical sheet (11). The first functional coating layer and the second functional coating layer may be the same type, or different types, of functional coating layers.

As an example, the optical sheet further comprises a functional coating layer disposed under the prism sheet, and the functional coating layer may be selected from the group consisting of a light diffusion layer, a grinding prevention layer, and a heat-resistant coating layer.

The light diffusion layer may conceal the prism pattern or the like by diffusing light. The optical sheet may further comprise one, two, or more light diffusion layers. Specifically, a first light diffusion layer and a second light diffusion layer may be formed in the lower part and in the upper part of the optical sheet, respectively. The first light diffusion layer may have a haze of 3% to 30%, more specifically, a haze of 7% to 17%. The second light diffusion layer may have a haze of 60% to 99%, more specifically, a haze of 60% to 98%. When the haze is within the above preferred ranges, there is an advantage of high luminance with sufficient concealing power.

The grinding prevention layer can prevent the interfacial grinding phenomenon caused by a dot printing pattern under the light guide plate or an embossed pattern by laser processing, after lamination of the optical sheet and the light guide plate, or by friction wear due to vibration on the upper part of the optical sheet. The grinding prevention layer may comprise beads dispersed in a polymer resin. The beads form roughness on the surface, thereby serving to prevent the grinding phenomenon or the like with the light guide plate.

The heat-resistant coating layer comprises a heat-resistant polymer resin, thereby serving to increase the thermal resistance of the optical sheet. The heat-resistant polymer resin may comprise, for example, a phenyl silicone-based resin.

The hard coating layer may be provided on the outermost side of the optical sheet to improve surface hardness. The surface hardness of the hard coating layer may be 2H or higher, specifically, 3H or higher, or 4H or higher.

Figure 11A:
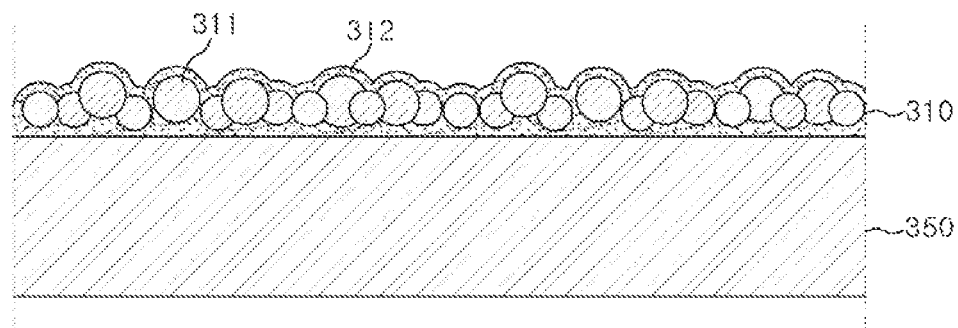
FIGS. 11a and 11b are cross-sectional views of a first functional coating layer and a second functional coating layer employed in an optical sheet according to an embodiment.
Figure 11B:
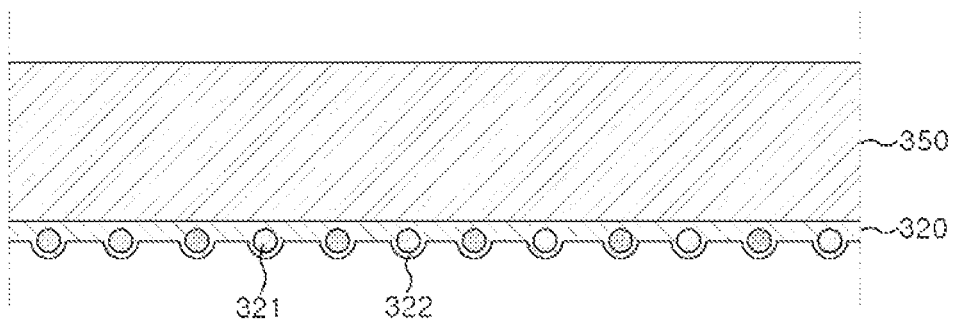

Referring to FIGS. 11a and 11b, the first functional coating layer (310) may comprise beads (311) and a binder resin (312). In addition, the second functional coating layer (320) also may comprise beads (321) and a binder resin (322).

The bead may be an organic bead. The specific material may be one or more selected from the group consisting of an acrylate-based resin, a polystyrene resin, a nylon resin, and a silicone resin. More specifically, it may be a hard acrylate-based resin. Although the shape of the bead is not particularly limited, it may be, for example, a spherical shape. In addition, it is advantageous from the viewpoint of concealing power, luminance, and prevention of grinding with an adjacent layer that the beads have an average particle diameter of 5 μm to 20 μm. More specifically, it may be 0.5 μm to 10 μm or 0.8 μm to 6 μm.

The binder resin may be at least one of a thermoplastic resin, a thermosetting resin, and a photocurable resin.

Specific examples of the thermoplastic resin and thermosetting resin include acrylic-based resins, urethane-based resins, epoxy-based resins, urethane acrylate-based resins, epoxy acrylate-based resins, cellulose-based resins, acetal-based resins, melamine-based resins, phenol-based resins, silicone-based resins, polyester resins, polycarbonate resins, polyethylene resins, polystyrene resins, polyamide resins, polyimide resins, and mixtures thereof.

A photopolymerizable prepolymer that is crosslinked and cured by UV light irradiation may be used as the UV curable resin, and examples of the photopolymerizable prepolymer include cationic polymerization type and radical polymerization type photopolymerizable prepolymers. Examples of the cationic polymerization type photopolymerizable prepolymer include an epoxy-based resin or a vinyl ester-based resin. Examples of the epoxy-based resin include bisphenol-based epoxy resins, novolac-type epoxy resins, alicyclic epoxy resins, aliphatic epoxy resins, and mixtures thereof.

The functional coating layer may further comprise a thermal stabilizer, a UV photoinitiator, a coupling agent, an antioxidant, a surfactant, a silicone additive, a UV absorber, and the like, if necessary.

The UV photoinitiator is not particularly limited as long as it can be used to cure a UV curable resin. Examples thereof include cationic photoinitiators such as α-hydroxyketone, phenylglyoxylate, benzyldimethyl-ketal, α-aminoketone, triarylsulfonium hexafluoroantimonate, triarylsulfonium hexafluorophosphate, and diaryliodonium salts.

Examples of the coupling agent include a silane coupling agent, a titanate-based coupling agent, an aluminate-based coupling agent, and a silicone compound. The coupling agent may be used alone or in combination.

Examples of the antioxidant include phenol-based, sulfur-based, or phosphorus-based antioxidants. The antioxidant may be used to prevent the degradation of a thermosetting resin composition due to oxidation thereof, thereby enhancing the heat resistance stability of a cured product.

The surfactant is a compound having a hydrocarbon hydrophobic group of a certain length and a hydrophilic group such as —COONa and —OSO$_3$Na in the molecule. Examples thereof include anionic surfactants, cationic surfactants, nonionic surfactants, amphoteric surfactants, sulfonates, sulfates, sulfate ester salts, ethoxylates, and the like. The surfactant may be used alone or in combination.

Base Film

The optical sheet according to an embodiment may further comprise a base film to be coated with the functional coating layer. That is, the functional coating layer may be coated on the base film.

The material of the base film may be, for example, a polyester resin, specifically, a polyethylene terephthalate resin.

Reflective Polarizing Film

The optical sheet according to an embodiment may comprise a reflective polarizing film to enhance luminance. For example, the reflective polarizing film may be disposed on the prism sheet.

The reflective polarizing film refers to a film that produces a desired optical effect by a plurality of thin films laminated therein. Examples thereof include a double brightness enhancement film (DBEF).

Specifically, the reflective polarizing film may comprise two or more types of thin films having different optical properties in a laminated form.

Figure 12:
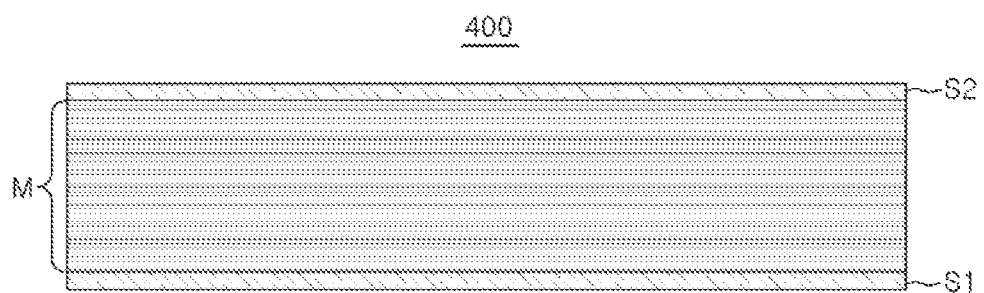
FIG. 12 is a cross-sectional view of a reflective polarizing film employed in an optical sheet according to an embodiment.

As shown in FIG. 12, the reflective polarizing film may have a laminate (M) of a plurality of thin films between the two skin layers (S). In such event, the different optical properties of the thin films may be refractive index or retardation.

As a specific example, the reflective polarizing film may be one in which a first resin layer and a second resin layer having different optical properties are alternately laminated in 100 to 2,000 layers, specifically, 800 to 1,000 layers.

Cushioning Film

The optical sheet may further comprise a cushioning film to protect the skin layer of the reflective polarizing film. Specifically, as shown in FIG. 4, when the prism sheet (220) is disposed under the reflective polarizing film (400), the pattern of the prism sheet (220) may affect the thin film of the reflective polarizing film, thereby deteriorating its performance. Accordingly, a cushioning film (500) may be interposed between the reflective polarizing film (400) and the prism sheet (220) to prevent the deterioration in performance.

The material of the cushioning film may be, for example, a polyester resin, specifically, a polyethylene terephthalate resin.

Adhesive Layer

The optical sheet may comprise an adhesive layer between its constituent elements (prism sheet, base film, reflective polarizing film, cushioning film, and the like).

Commonly used thermosetting resins and UV curable resins may be used as the material of the adhesive layer. For example, acrylic-based, urethane-based, epoxy-based, vinyl-based, polyester-based, polyamide-based resins, or mixtures thereof may be used. Examples of the acrylic-based resin include homopolymers or copolymers and blended resins of a methyl methacrylic, methacrylic, ethylacrylic, butylacrylic, arylacrylic, hexylacrylic, isopropylmethacrylic, benzylacrylic, vinylacrylic, or 2-methoxyethylacrylic resin.

Preferred examples of the material of the adhesive layer include (meth)acrylate resins, unsaturated polyester resins, polyester (meth)acrylate resins, silicone urethane (meth)acrylate resins, silicone polyester (meth)acrylate resins, fluorine urethane (meth)acrylate resins, and mixtures thereof.

Thickness of Each Component of the Optical Sheet

The thickness of the components of the optical sheet described above may be adjusted within a certain range.

The thickness of the prism sheet may be 50 μm or more or 80 μm or more, and 300 μm or less or 200 μm or less.

The thickness of the functional coating layer may be 3 μm or more or 5 μm or more, and 30 μm or less or 20 μm or less.

The thickness of the base film may be 50 μm or more or 70 μm or more, and 200 μm or less or 150 μm or less.

The thickness of the reflective polarizing film may be 50 μm or more or 70 μm or more, and 200 μm or less or 150 μm or less.

The thickness of the cushioning film may be 50 μm or more or 70 μm or more, and 200 μm or less or 150 μm or less.

As a specific example, the reflective polarizing film may have a thickness of 50 μm to 200 μm, the cushioning film may have a thickness of 50 μm to 200 μm, the prism sheet may have a thickness of 50 μm to 350 μm, and the functional coating layer may have a thickness of 3 μm to 30 μm.

Lamination Configuration of the Optical Sheet

The components of the optical sheet (prism sheet, functional coating layer, reflective polarizing film, cushioning film, and the like) described above may be disposed in an optical path.

In addition, the components of the optical sheet may be combined with each other. The combination may be a direct combination or an indirect combination through an adhesive layer or the like. Accordingly, the optical sheet may comprise a laminate in which the components are directly or indirectly combined.

As an example, the optical sheet may further comprise a prism sheet; and a functional coating layer disposed under the prism sheet, wherein the prism sheet and the functional coating layer may be directly or indirectly combined with each other.

In addition, the optical sheet may further comprise a reflective polarizing film disposed on the prism sheet; and a functional coating layer disposed on the reflective polarizing film, wherein the reflective polarizing film may comprise two or more thin films having different optical properties in a laminated form. In addition, the optical sheet may further comprise a cushioning film between the reflective polarizing film and the prism sheet, wherein the reflective polarizing film, the cushioning film, the prism sheet, and the functional coating layer may be directly or indirectly combined with each other.

The optical sheet may comprise two or more prism sheets. Specifically, the prism sheet may comprise a first prism sheet and a second prism sheet. The first prism sheet and the second prism sheet may be the same as, or different from, each other in their patterns. For example, the prism sheet may comprise a first prism sheet comprising a first prism pattern extending in a first direction in a plane; and a second prism sheet comprising a second prism pattern extending in a second direction in a plane that intersects with the first direction. Specifically, the first prism sheet and the second prism sheet may be perpendicular to each other in the grain directions of their patterns. More specifically, the first prism sheet may be a horizontal prism sheet, and the second prism sheet may be a vertical prism sheet, or vice versa. In addition, the pattern layer of the first prism sheet and the pattern layer of the second prism sheet may both face the same direction or may face different directions.

The position of the prism sheet (in particular, the position of the prism pattern layer relative to other components) within the optical sheet may be adjusted to enhance the optical performance.

For example, the prism sheet may comprise a first prism sheet; and a second prism sheet disposed on the first prism sheet, wherein the first prism sheet may comprise a first base layer and a first prism pattern layer disposed on the first base layer, and the second prism sheet may comprise a second base layer and a second prism pattern layer disposed on the second base layer. Accordingly, the first prism sheet may be disposed at a rear side of the second prism sheet with respect to the front side from which light incident on the optical sheet is emitted. In such event, the first prism pattern layer may extend in a first direction in a plane, and the second prism pattern layer may extend in a second direction in a plane that intersects with the first direction. In addition, at least one of the first prism pattern layer and the second prism pattern layer may comprise a light absorber that selectively absorbs light in a specific wavelength band, and the light absorber may comprise one or more organic dyes.

In addition, the optical sheet may further comprise a first functional coating layer disposed under the first prism sheet; and a second functional coating layer disposed on the second prism sheet, wherein the first functional coating layer and the second functional coating layer may each be selected from the group consisting of a light diffusion layer, a grinding prevention layer, a heat-resistant coating layer, and a hard coating layer, and the first functional coating layer, the first prism sheet, the second prism sheet, and the second functional coating layer may be directly or indirectly combined with each other.

In addition, the optical sheet may further comprise a reflective polarizing film interposed between the second prism sheet and the second functional coating layer; and a cushioning film interposed between the second prism sheet and the reflective polarizing film, wherein the reflective polarizing film may have a structure in which a first resin layer and a second resin layer having different optical properties are alternately laminated in 100 to 2,000 layers.

Referring to FIG. 4, light incidents on the bottom of the optical sheet (11) and is emitted from the top thereof, and a first prism sheet (210) comprising a light absorber may be disposed under the second prism sheet (220). According to this arrangement, since light incident from a light source passes through the first prism pattern layer comprising a light absorber before it passes through the entire second prism sheet, the color deviation according to the viewing angle can be minimized.

Specifically, the prism sheet may comprise a first prism sheet comprising a light absorber and a first prism pattern extending in a first direction; and a second prism sheet comprising a second prism pattern extending in a second direction that intersects with the first direction, wherein the first prism sheet may be disposed under the second prism sheet, and a first functional coating layer may be disposed under the first prism sheet.

Figure 5A:
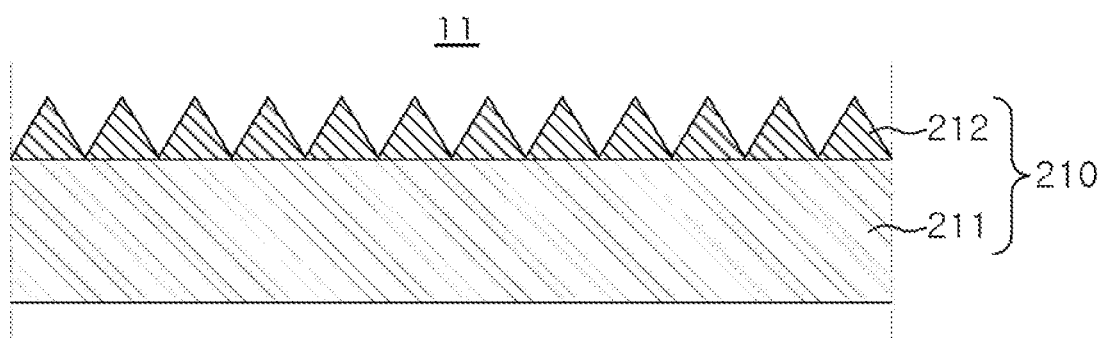
FIGS. 5a to 5e show cross-sectional views of the optical sheets of Examples 1 to 5.

As a specific example, as shown in FIG. 5a, the optical sheet (11) may be composed of a first prism sheet (210) comprising a light absorber.

Figure 5B:
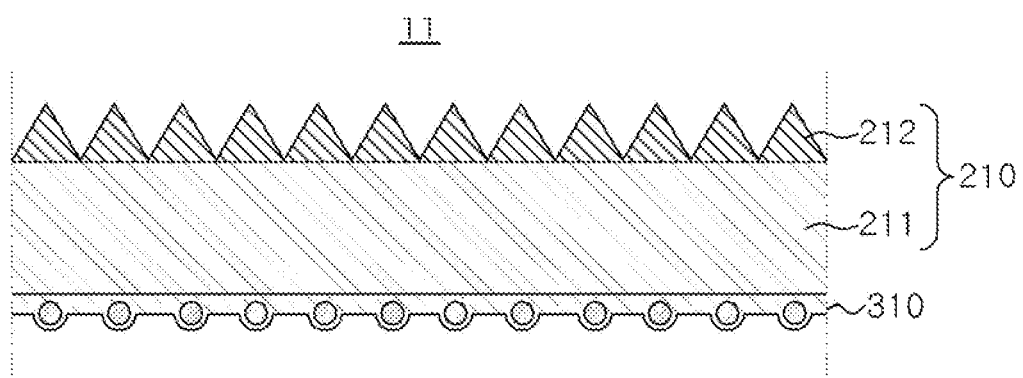

As another specific example, as shown in FIG. 5b, the optical sheet (11) may be one in which a first prism sheet (210) comprising a light absorber and a first functional coating layer (310) are laminated in order.

Figure 5C:
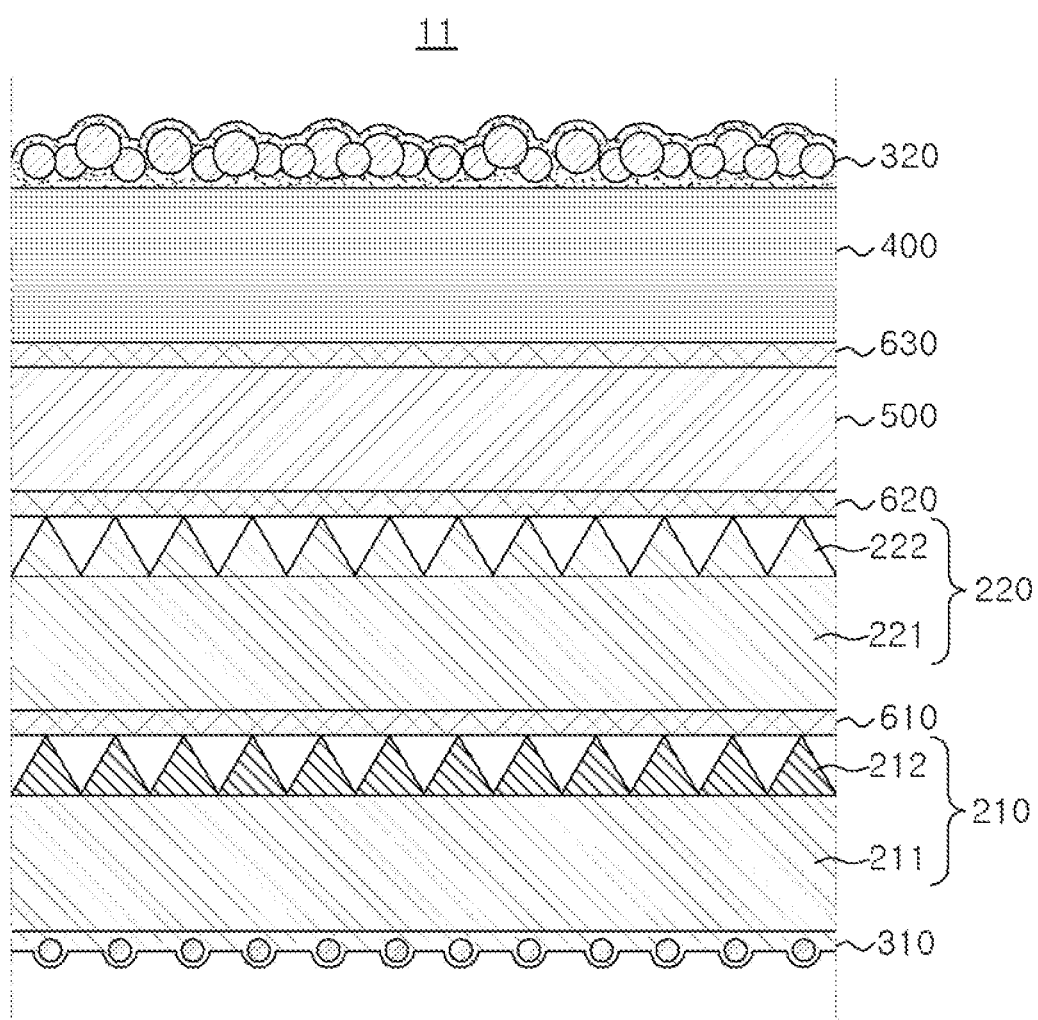

As another specific example, as shown in FIG. 5c, the optical sheet (11) may be one in which a second functional coating layer (320), a reflective polarizing film (400), a cushioning film (500), a second prism sheet (220), a first prism sheet (210) comprising a light absorber, and a first functional coating layer (310) are laminated in order, wherein an adhesive layer (610, 620, 630) may be formed between them.

Figure 5D:
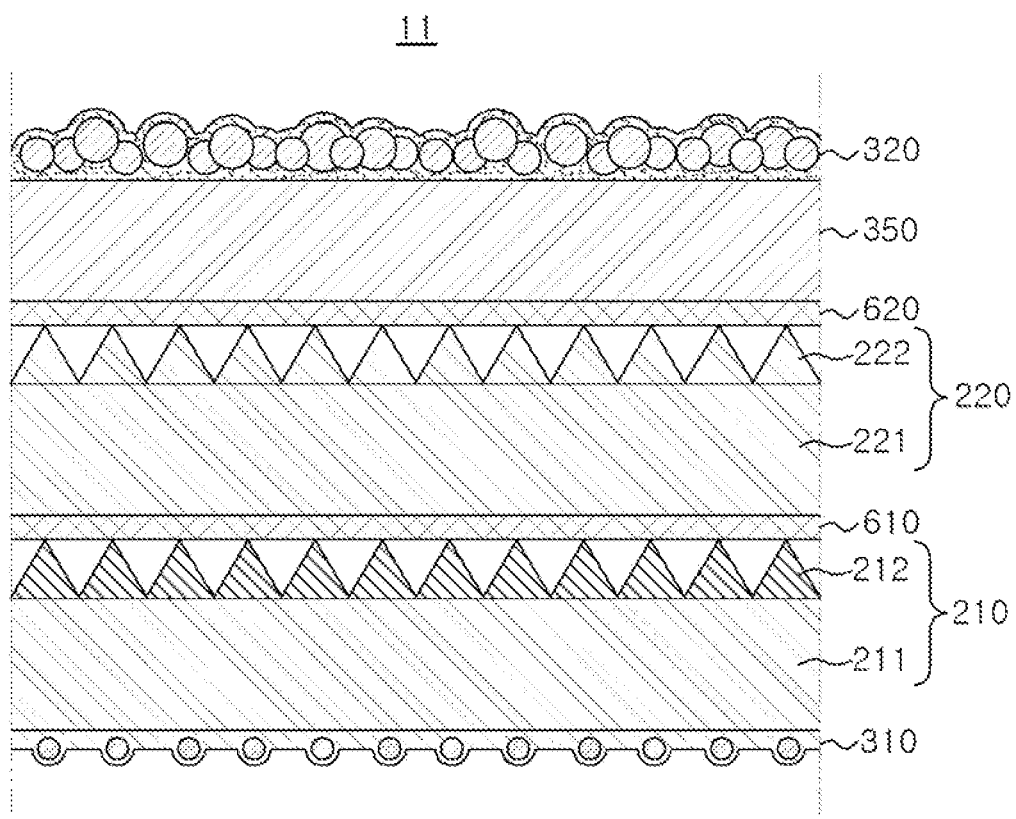

As another specific example, as shown in FIG. 5d, the optical sheet (11) may be one a second functional coating layer (320), a base film (350), a second prism sheet (220), a first prism sheet (210) comprising a light absorber, and a first functional coating layer (310) are laminated in order, wherein an adhesive layer (610, 620) may be formed between them.

Figure 5E:
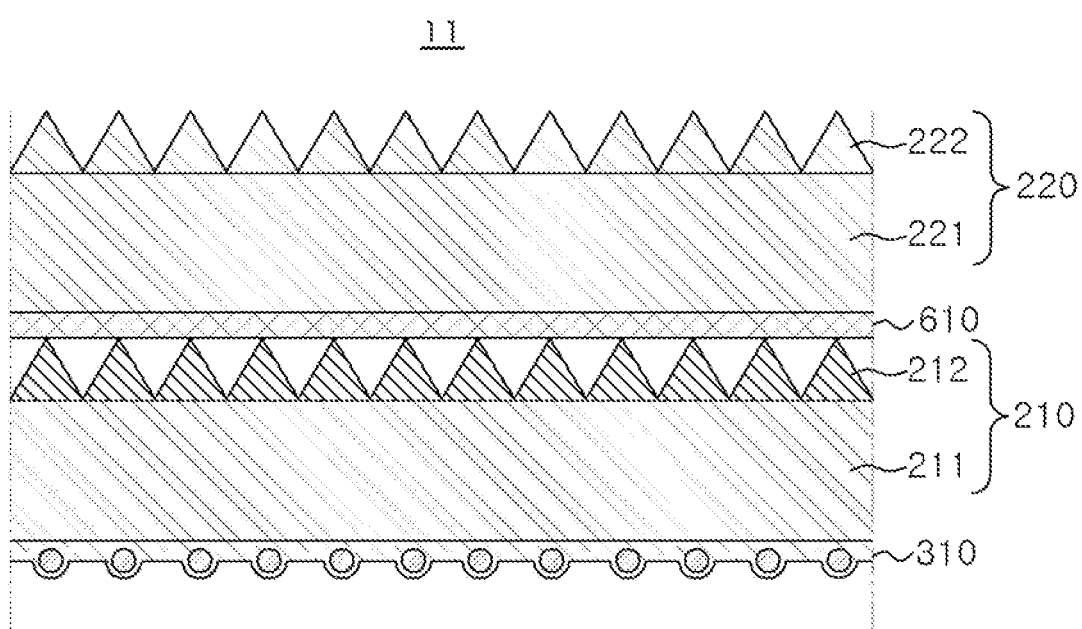

As another specific example, as shown in FIG. 5e, the optical sheet (11) may be one a second prism sheet (220), a first prism sheet (210) comprising a light absorber, and a first functional coating layer (310) are laminated in order, wherein an adhesive layer (610) may be formed between the second prism sheet (220) and the first prism sheet (210).

As another specific example, in the laminated structure of FIGS. 5a to 5e, a light absorber may be contained in the second prism pattern layer (222) instead of the first prism pattern layer (212), or a light absorber may be contained in both the first prism pattern layer (212) and the second prism pattern layer (222).

Color Gamut

A display device comprising the optical sheet according to an embodiment may be enhanced in color gamut as compared with the conventional one.

Color gamut refers to the gamut of color that each medium can reproduce in the entire gamut of light. In general, the evaluation of the color gamut of any medium is carried out by obtaining a triangle consisting of three RGB points in CIE (Commission Internationale de L'eclairage) chromaticity coordinates and comparing it with an RGB triangle of the NTSC (National Television System Committee) or DCI (Digital Cinema Initiatives) standard.

Chromaticity refers to the features of color excluding brightness, and CIE 1976 chromaticity coordinate u'v' is a method that can be expressed closest to the color perceived by humans.

Figure 2:
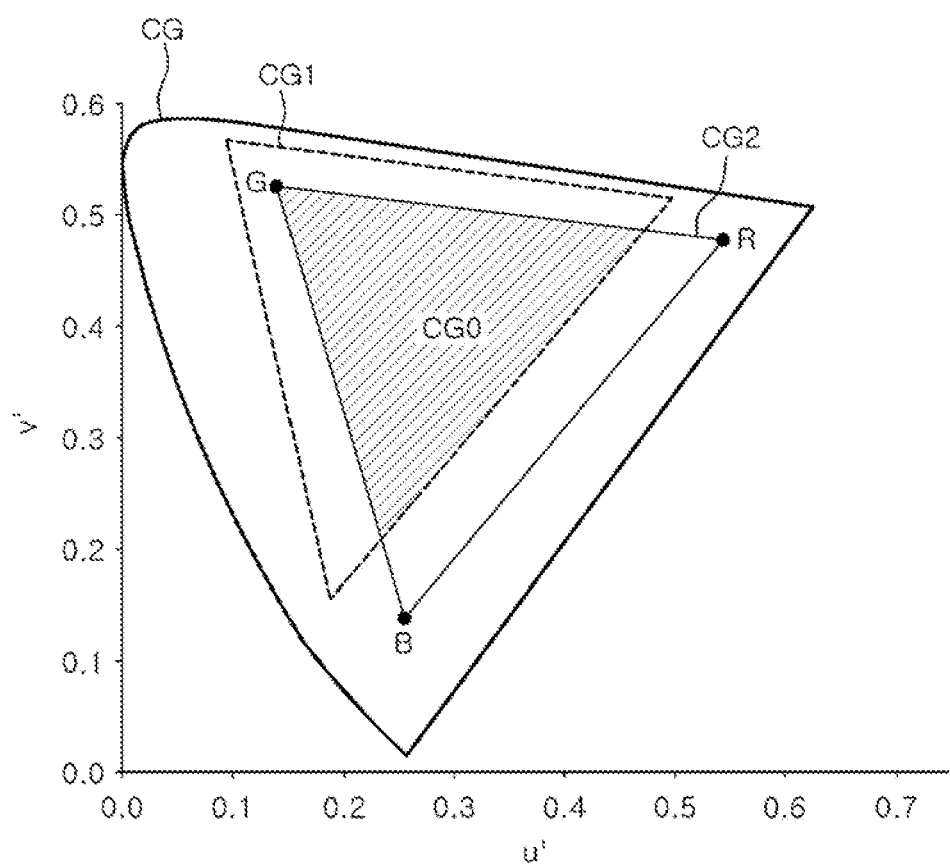
FIG. 2 shows a method of calculating a color gamut from CIE 1976 chromaticity coordinates u'v'.

FIG. 2 shows a method of calculating a color gamut from CIE 1976 chromaticity coordinates u'v'. As shown in FIG. 2, a first color gamut (CG1) is drawn as a reference within the entire gamut (CG) of chromaticity coordinates, and a second color gamut (CG2) having the coordinates of red (R), green (G) and blue (B) measured from a sample as vertices. Then, the area of the overlapping color gamut (CG0) between them is obtained. Thereafter, the color gamut of the sample can be measured by calculating the ratio between the areas of these gamuts. For example, a triangle of the DCI color gamut (first color gamut) is drawn as a reference in the chromaticity coordinates (CIE 1931 chromaticity coordinates xy or CIE 1976 chromaticity coordinates u'v'), and a triangle of the color gamut (second color gamut) measured from a sample is drawn. Then, the DCI area ratio may be calculated as a percentage (%) of the area of the second color gamut to the area of the first color gamut. In addition, once the overlapping color gamut of the two color gamuts has been obtained, the DCI overlapping ratio may be calculated as a percentage (%) of the area of the overlapping color gamut to the area of the first color gamut.

For example, a display device comprising the optical sheet may have a DCI area ratio of 80% or more, specifically, 85% or more, 90% or more, or 95% or more, in the CIE 1931 chromaticity coordinates xy.

In addition, a display device comprising the optical sheet may have a DCI overlapping ratio of 80% or more, specifically, 85% or more, 90% or more, or 95% or more, in the CIE 1976 chromaticity coordinates u'v'.

As an example, a display device comprising the optical sheet may have a DCI overlapping ratio of 90% or more in the CIE 1976 chromaticity coordinates u'v' and a luminance of 250 cd/m$^2$ or more, 260 cd/m$^2$ or more, or 270 cd/m$^2$ or more, for white light.

In addition, a display device comprising the optical sheet has a small change in chromaticity coordinate values according to the viewing angle, so that a color deviation according to the viewing angle may be effectively reduced.

Specifically, a display device comprising the optical sheet may have a value of $\Delta u'v'(60D)$ of 0.015 or less, more specifically, 0.012 or less, 0.01 or less, or 0.007 or less, according to the following equation:

$$\Delta u'v'(60D) = [(u'0-u'60)^2 + (v'0-v'60)^2]^{1/2}$$

In the above equation, u'0 and u'60 are CIE 1976 chromaticity coordinates u' values measured at the front and at an angle of 60° of a display device, respectively, and v'0 and v'60 are CIE 1976 chromaticity coordinate v' values measured at the front and at an angle of 60° of a display device, respectively.

In addition, a display device comprising the optical sheet may also have a value of $\Delta u'v'(-60D)$ of 0.015 or less, 0.012 or less, 0.01 or less, or 0.007 or less, measured at the front and at an angle of −60° of the display device in the same manner as described above.

Wavelength Absorption Selectivity

The optical sheet comprises a light absorber, specifically, an organic dye, in the prism pattern, so that it has excellent absorption selectivity for light in a specific wavelength band. Accordingly, the transmission spectral curve of the optical sheet may represent a narrow and deep valley at a specific wavelength in the visible light band (see FIG. 13).

On the other hand, if a pigment or phosphor other than an organic dye is used as a light absorber, it is difficult to achieve such a selective absorption characteristic for the light of a specific wavelength. Specifically, according to the embodiment, since the organic dye is uniformly dissolved in a solvent and added to the prism pattern, the wavelength absorption selectivity can be very excellent. Since it hardly absorbs other wavelengths, the decrease in luminance can be minimized. On the other hand, if a pigment or phosphor is used as a light absorber, it is dispersed in a solvent without being dissolved. Thus, the absorption selectivity for a specific wavelength is poor, and it is not suitable for use in enhancing the color gamut.

The transmittance of each wavelength measured on the optical sheet is subtracted from the transmittance of each wavelength measured once the light absorber has been removed from the optical sheet to obtain a net absorbance. When it is expressed as a spectral curve (i.e., a graph in which the horizontal axis is a wavelength and the vertical axis is a net absorbance), the main absorption peak may appear very sharp and narrow (see FIG. 14).

For example, the optical sheet may satisfy the following Inequation (1):

$$\text{FWHM} \leq 50 \text{ nm} \quad (1)$$

In Inequation (1), FWHM is a full width at half maximum (nm) of the maximum peak in the spectral curve of net absorbance with respect to wavelength. In order to measure the net absorbance, a light source is prepared, a first transmittance (T1) is measured by passing light from the light source through the optical sheet, a reference sheet from which the light absorber has been removed from the optical sheet is prepared, a second transmittance (T0) is measured by passing light from the light source through the reference sheet, and the first transmittance (T1) is subtracted from the second transmittance (T0) to obtain the net absorbance.

Specifically, the value of FWHM in Inequation (1) may be 0 nm to 50 nm or 10 nm to 40 nm.

More specifically, the maximum peak in the net absorption spectrum may appear in the first absorption wavelength band, where the first absorption wavelength band may be 500 nm to 700 nm, specifically, 550 nm to 650 nm. In addition, the height of the maximum peak in the spectral curve of the net absorbance may be 5% or more, for example, 10% or more, specifically, 5% to 50% or 10% to 30%.

In addition, the light source used to measure the net absorbance may be a light source that emits white light having a continuous emission spectrum.

Process for Preparing an Optical Sheet

The process for preparing an optical sheet according to an embodiment comprises coating a composition for forming a prism pattern on the upper side of a base layer, transferring a pattern, and then UV curing the composition to form a prism pattern layer, wherein the composition for forming a prism pattern comprises a binder resin, a light absorber, a UV blocking agent, an antioxidant, and a light stabilizer, and the light absorber comprises at least one organic dye that selectively absorbs light in a specific wavelength band.

FIG. 8 shows a process of preparing an optical sheet, specifically, a prism sheet containing a light absorber, according to an embodiment. Referring to FIG. 8, (a) a base layer (201) is prepared, (b) a composition (202') for a prism pattern, which comprises a light absorber, a binder resin, and other additives (a UV blocking agent, an antioxidant, and a light stabilizer, and the like), is coated on the base layer (201), and, then, (c) a prism pattern is formed and cured with UV light to obtain a prism sheet (200) on which the prism pattern layer (202) is formed.

The type and content of each component contained in the composition for forming a prism pattern are as exemplified above in the type and content of each component contained in the prism pattern layer. For example, the composition for forming a prism pattern may comprise 0.01 to 1 part by weight of the light absorber relative to 100 parts by weight of the binder resin, the UV blocking agent in a weight of 10 to 100 times the weight of the light absorber, the antioxidant in a weight of 1 to 10 times the weight of the light absorber, and the light stabilizer in a weight of 10 to 50 times the weight of the light absorber.

The composition for forming a prism pattern may further comprise an organic solvent to control its viscosity for coating. For example, the solvent may be contained such that the solids content of the composition is 10% to 50% by weight. Specific examples of the organic solvent include toluene, methyl ethyl ketone, ethyl acetate, and the like. Other solvents may be used. According to the embodiment, since the light absorber comprises an organic dye, it is uniformly dissolved in an organic solvent to enhance light absorption characteristics after coating.

The prism pattern may be formed by transferring a pattern formed on a cylindrical master roll to a coating layer by a roll-to-roll method. First, the outer surface of the master roll (i.e., the circumferential surface of the cylinder) may be cut with a bite or laser to engrave a pattern on the master roll. Thereafter, the composition for forming a pattern may be coated on a base film, and the pattern of the master roll may be transferred to the coating layer to form a prism pattern. Alternatively, a plastic raw material may be melted with heat by extrusion, and the pattern of the master roll may be transferred while the liquid plastic flat plate is solidified, thereby forming a prism pattern.

In addition, the prism pattern may be prepared at different heights. A master roll for this purpose may be prepared by, for example, cutting with a diamond tool. As a specific example, while a cylindrical roll made of a material such as hard copper is rotated, a diamond tool moves in the transverse direction for screw cutting along the circumference of the roll, thereby forming a continuous groove pattern. In such event, the moving speed of the diamond tool may be adjusted to change the pitch of the prism pattern, and the depth of penetration of the diamond tool into the cylindrical roll, the horizontal/vertical angle between the tool and the surface of the roll, and the rotation speed of the cylindrical roll may be adjusted to change the specification of the prism pattern more diversely and specifically.

The prism pattern thus formed may be cured by irradiation with UV light to constitute a prism pattern layer. Specifically, the UV curing may be carried out at a UV irradiation dose of about 100 to 200 mJ/cm$^2$.

The prism pattern prepared according to the above process comprises at least one organic dye that selectively absorbs light in a specific wavelength band, whereby it is possible to provide an optical sheet by a simple manufacturing process in which the color gamut is enhanced while a decrease in luminance due to light absorption is minimized.

The process for preparing an optical sheet according to another embodiment comprises (1) forming a functional coating layer on the lower side of a base layer; and (2) coating a composition for forming a prism pattern on the upper side of the base layer, transferring a pattern, and then UV curing the composition to form a prism pattern layer, wherein the composition for forming a prism pattern comprises a binder resin, a light absorber, a UV blocking agent, an antioxidant, and a light stabilizer, and the light absorber comprises at least one organic dye that selectively absorbs light in a specific wavelength band.

The process for preparing an optical sheet according to another embodiment comprises (1) forming a first functional coating layer on the lower side of a first base layer; (2a) coating a composition for forming a first prism pattern on the upper side of the first base layer, transferring a pattern, and then UV curing the composition to form a first prism pattern layer; (2b) laminating a second base layer on the upper side of the first prism pattern layer; and (3) forming a second prism pattern layer on the upper side of the second base layer, wherein the composition for forming a first prism pattern comprises a binder resin, a light absorber, a UV blocking agent, an antioxidant, and a light stabilizer, and the light absorber comprises at least one organic dye that selectively absorbs light in a specific wavelength band.

In the process according to the embodiment, steps (2a) and (2b) may be carried out in separate process lines or may be carried out simultaneously in one process line.

Figure 9A:
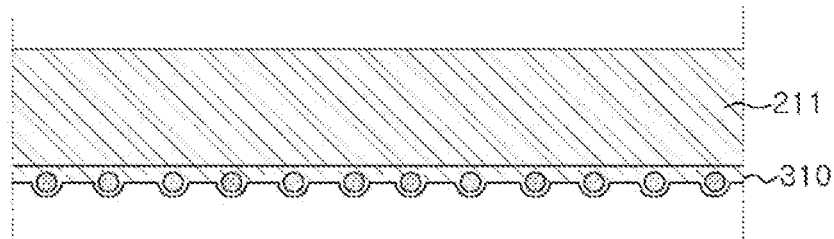
FIGS. 9a to 9c show a process for preparing an optical sheet according to another embodiment.
Figure 9B:
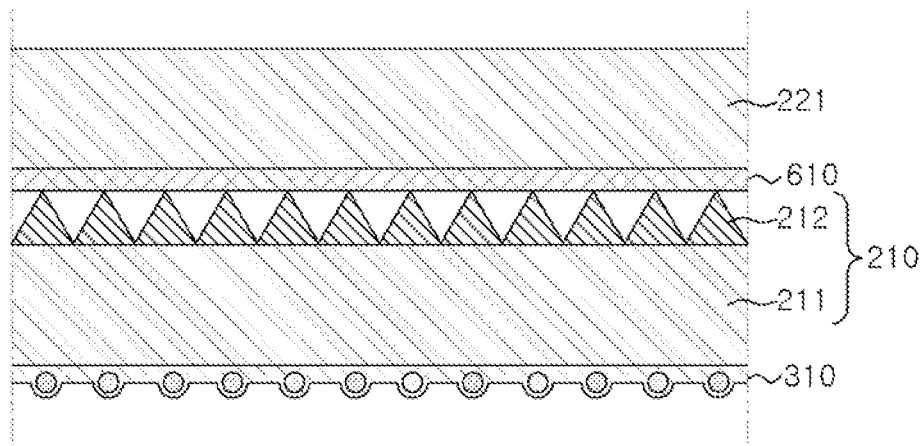
Figure 9C:
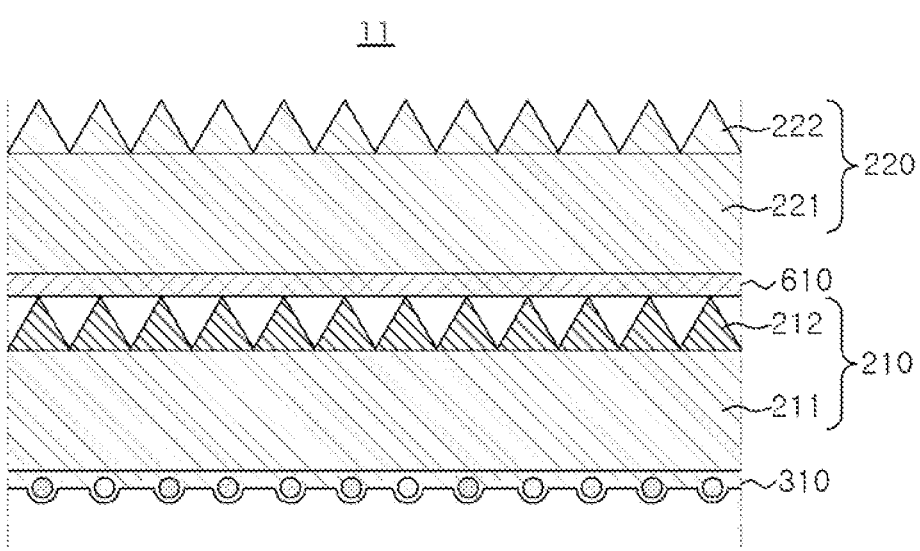

FIGS. 9a to 9c show a process for preparing an optical sheet according to the embodiment. Referring to FIGS. 9a to 9c, the process for preparing an optical sheet comprises (1) forming a first functional coating layer (310) on the lower side of a first base layer (211); (2a) coating a composition for forming a first prism pattern on the upper side of the first base layer (211), transferring a pattern, and then UV curing the composition to form a first prism pattern layer (212); (2b) laminating a second base layer (221) on the upper side of the first prism pattern layer (212); and (3) forming a second prism pattern layer (222) on the upper side of the second base layer (221), wherein the composition for forming a first prism pattern comprises a binder resin, a light absorber, a UV blocking agent, an antioxidant, and a light stabilizer, and the light absorber comprises at least one organic dye that selectively absorbs light in a specific wavelength band.

In addition, in the process according to the embodiment, a composition comprising a binder resin, a light absorber, a UV blocking agent, an antioxidant, and a light stabilizer may be used as a composition for preparing the second prism pattern layer (222) instead of the first prism pattern layer (212), or a composition comprising a binder resin, a light absorber, a UV blocking agent, an antioxidant, and a light stabilizer may be used as a composition for preparing both the first prism pattern layer (212) and the second prism pattern layer (222).

Figure 7:
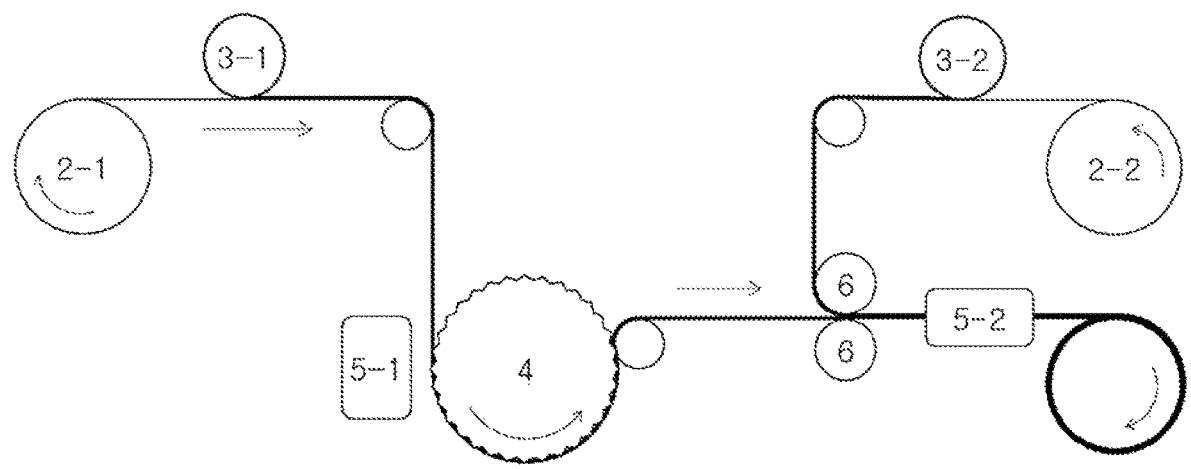
FIG. 7 shows a process of forming a first prism pattern layer and laminating it with a second base layer.

FIG. 7 shows a process of forming a first prism pattern layer using a pattern roll and laminating it with a second base layer. Referring to FIG. 7, a first base layer having a first functional coating layer formed on the rear side is unwound from a first unwinding roll (2-1), and a composition for a first prism pattern layer is coated on the first base layer by a first coating device (3-1). Thereafter, a prism pattern is formed by a pattern roll (4) and, at the same time, a first prism pattern layer is prepared by UV curing by a first curing device (5-1). Separately, a second base layer is unwound from a second unwinding roll (2-2), and a UV curable adhesive composition is coated on the second base layer by a second coating device (3-2). Thereafter, after it is laminated on the surface of the first prism pattern layer while passing between the two pressure rolls (6), it is UV cured by a second curing device (5-2) to obtain a composite sheet having the second base layer, the first prism pattern layer, the first base layer, and the first functional coating layer. Thereafter, a second prism pattern layer is formed on the surface of the second base layer of the composite sheet to obtain a final optical sheet.

MODE FOR THE INVENTION

Hereinafter, the embodiments will be described with more specific examples, but the scope of the embodiments is not limited thereto.

Preparation Example 1

The following components were mixed to prepare a composition for a light absorption pattern layer.

100 parts by weight of an epoxy-modified acrylate resin (solids content of 100%, SHPR-HV200, SMS Co., Ltd.)

Light absorber: 0.02 part by weight of an organic dye (C590B, Kyung-In Synthetic Company)

1 part by weight of a UV blocking agent (Tinuvin-928, BASF)

0.1 part by weight of an antioxidant (Irganox-1010, BASF)

0.5 part by weight of a light stabilizer (Tinuvin-292, BASF)

0.5 part by weight of a photoinitiator (TPO, BASF)

A solvent (methyl ethyl ketone/toluene=1:1) was blended such that the solids content in the composition was 80% by weight Preparation Example 2

A composition for a light absorption pattern layer was prepared by changing the content of the light absorber in the composition of Preparation Example 1 to 0.03 part by weight.

Preparation Example 3

A composition for a light absorption pattern layer was prepared by changing the content of the light absorber in the composition of Preparation Example 1 to 0.04 part by weight.

Preparation Example 4

A composition for a light absorption pattern layer was prepared by not adding the light absorber to the composition of Preparation Example 1.

Example 1

The composition of Preparation Example 1 was coated on one side of a first base layer (PET) having a thickness of 188 μm. While a prism pattern was formed using a master roll having a pattern on its surface, it was cured by UV irradiation (100-200 mJ/cm$^2$) to prepared a first prism pattern layer having a thickness of about 40 μm. As a result, an optical sheet composed of a first prism sheet was obtained (see FIG. 5a).

Example 2

Step 1: A composition was prepared in which 15 parts by weight of polybutyl methacrylate (PBMA) beads, 35 parts by weight of a urethane acrylate resin, and 50 parts by weight of methyl ethyl ketone (MEK) as a solvent were mixed. It was coated on one side of a first base layer (PET) having a thickness of 188 μm and dried to form a first light diffusion layer having a thickness of 5 μm.

Step 2: The composition of Preparation Example 1 was coated on the other side of the first base layer. While a prism pattern was formed using a master roll having a pattern on its surface, it was cured by UV irradiation (100-200 mJ/cm$^2$) to prepared a first prism pattern layer having a thickness of about 40 μm. As a result, an optical sheet having a first prism sheet and a first light diffusion layer was obtained (see FIG. 5b).

Example 3

Step 1: A composition was prepared in which 15 parts by weight of polybutyl methacrylate (PBMA) beads, 35 parts by weight of a urethane acrylate resin, and 50 parts by weight of methyl ethyl ketone (MEK) as a solvent were mixed. It was coated on one side of a first base layer (PET) having a thickness of 100 μm and dried to form a first light diffusion layer having a thickness of 5 μm.

Step 2: The composition of Preparation Example 1 was coated on the other side of the first base layer. While a prism pattern was formed using a master roll having a pattern on its surface, it was cured by UV irradiation (100-200 mJ/cm$^2$) to prepared a first prism pattern layer having a thickness of about 40 μm. A UV-curable adhesive resin was microgravure coated in a thickness of 0.5 to 1.0 μm on the surface of a second base layer (PET) having a thickness of 100 μm. After it was laminated on the surface of the first prism pattern layer, it was cured by irradiating UV light at a dose of about 1,000 mJ/cm$^2$.

Step 3: A second prism pattern layer having a thickness of about 40 μm was formed on the surface of the second base layer using a UV-curable resin, and it was UV cured to prepare a second prism sheet.

Step 4: A UV-curable adhesive resin was coated on one side of a cushioning film (PET) having a thickness of 100 μm using a Mayer bar to a thickness of 0.5 to 1.0 μm. It adhered to the surface of the prism pattern layer of the second prism sheet previously prepared and UV cured.

Step 5: A composition was prepared in which 15 parts by weight of polymethyl methacrylate (PMMA) beads, 35 parts by weight of an acryl binder resin, and 50 parts by weight of methyl ethyl ketone (MEK) as a solvent were mixed. This composition was coated on one side of a double brightness enhancement film (DBEF, Qv2, 3M) having a thickness of 95 μm and dried to form a second light diffusion layer having a thickness of 10 μm. A UV-curable adhesive resin was coated on the other side of the double brightness enhancement film using a Mayer bar to a thickness of 10 μm. It adhered to the surface of the cushioning film previously prepared and UV cured to obtain an optical sheet (see FIG. 5c).

Example 4

Steps 1 to 3 of Example 3 were repeated to obtain an optical sheet having a first light diffusion layer, a first prism sheet, and a second prism sheet.

A composition was prepared in which 15 parts by weight of polymethyl methacrylate (PMMA) beads, 35 parts by weight of an acryl binder resin, and 50 parts by weight of methyl ethyl ketone (MEK) as a solvent were mixed. This composition was coated on one side of a base film (PET) having a thickness of 100 μm and dried to form a second light diffusion layer having a thickness of 15 μm. A UV-curable adhesive resin was coated on the other side of the base film using a Mayer bar to a thickness of 0.5 to 1.0 μm. It adhered to the surface of the prism pattern layer of the second prism sheet previously prepared and UV cured to obtain an optical sheet (see FIG. 5d).

Example 5

Step 1: A composition was prepared in which 15 parts by weight of polybutyl methacrylate (PBMA) beads, 35 parts by weight of a urethane acrylate resin, and 50 parts by weight of methyl ethyl ketone (MEK) as a solvent were mixed. It was microgravure coated on one side of a first base layer (PET) having a thickness of 125 μm and dried to form a first light diffusion layer having a thickness of 5 μm.

Step 2: The composition of Preparation Example 1 was coated on the other side of the first base layer. While a prism pattern was formed using a master roll having a pattern on its surface, it was cured by UV irradiation (100-200 mJ/cm$^2$) to prepared a first prism pattern layer having a thickness of about 40 μm. In addition, a UV-curable adhesive resin was microgravure coated in a thickness of 0.5 to 1.0 μm on the surface of a second base layer (PET) having a thickness of 125 μm. After it was laminated on the surface of the first prism pattern layer, it was cured by irradiating UV light at a dose of about 1,000 mJ/cm$^2$.

Step 3: A second prism pattern layer having a thickness of about 40 μm was formed on the surface of the second base layer using a UV-curable resin, and it was UV cured to prepare a second prism sheet. As a result, an optical sheet having a first light diffusion layer, a first prism sheet, and a second prism sheet was obtained (see FIG. 5e).

Example 6

Steps 1 to 3 of Example 5 were repeated, except that the composition of Preparation Example 2 was used as a composition for preparing the first prism pattern layer in step 2, thereby preparing an optical sheet.

Example 7

Steps 1 to 3 of Example 5 were repeated, except that the composition of Preparation Example 3 was used as a composition for preparing the first prism pattern layer in step 2, thereby preparing an optical sheet.

Comparative Example 1

Figure 6:
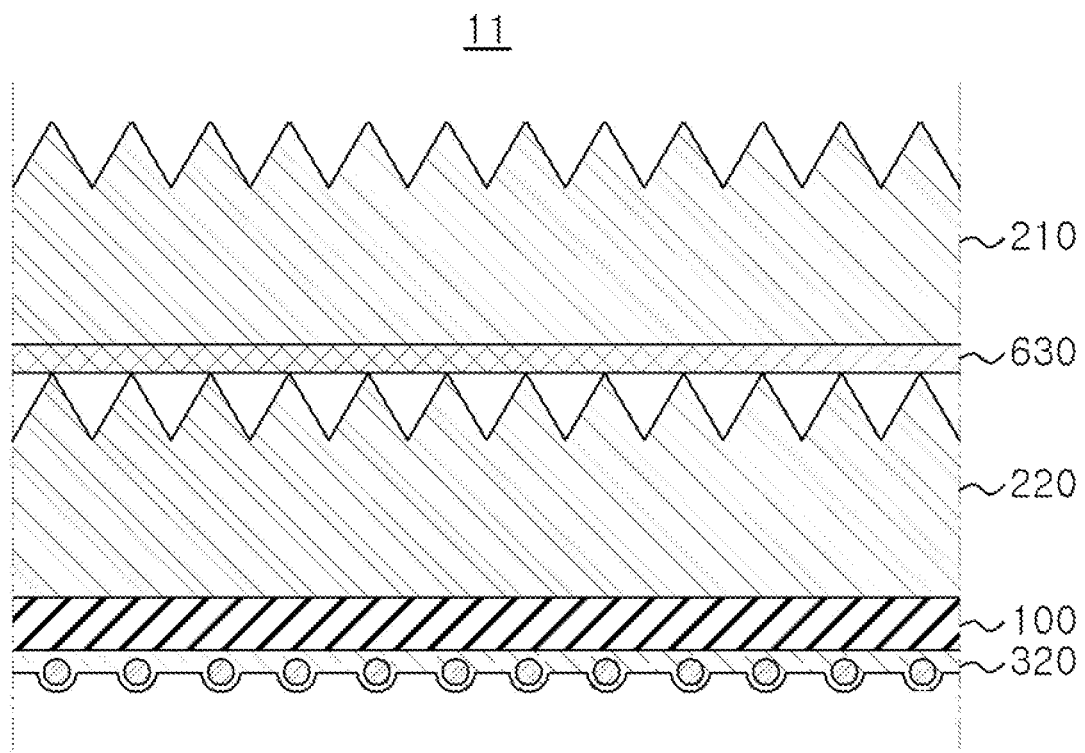
FIG. 6 shows a cross-sectional view of the optical sheet of Comparative Example 1.

Step 1: A composition for a light-absorbing layer (a composition in which 0.05 part by weight of a light absorber (PANAX NEC 584, Ukseung Chemical) was added to 100 parts by weight of a solution in which an acrylic binder resin (AOF-2914, Aekyung) and propylene glycol methyl ether (PGME) were mixed at a weight ratio of 30:70) was coated on one side of a first base layer (PET) having a thickness of 125 μm and dried to form a light-absorbing coating layer having a thickness of 3 Step 2: A composition was prepared in which 15 parts by weight of polybutyl methacrylate (PBMA) beads, 35 parts by weight of a urethane acrylate resin, and 50 parts by weight of methyl ethyl ketone (MEK) as a solvent were mixed. It was microgravure coated on the surface of the light-absorbing coating layer and dried to form a first light diffusion layer having a thickness of 5 μm.
Step 3: A UV-curable resin was coated on the other side of the first base layer. While a prism pattern was formed using a master roll having a pattern on its surface, it was cured by UV irradiation to prepared a first prism pattern layer having a thickness of about 40 μm. A UV-curable adhesive resin was microgravure coated in a thickness of 0.5 to 1.0 μm on the surface of a second base layer (PET) having a thickness of 125 μm. After it was laminated on the surface of the first prism pattern layer, it was cured by irradiating UV light at a dose of about 1,000 mJ/cm².
Step 4: A second prism pattern layer having a thickness of about 40 μm was formed on the surface of the second base layer using a UV-curable resin, and it was UV cured to prepare a second prism sheet. As a result, an optical sheet having a first light diffusion layer, a light-absorbing coating layer, a first prism sheet, and a second prism sheet was obtained (see FIG. 6).

Comparative Example 2

Steps 1 to 3 of Example 5 were repeated, except that the composition of Preparation Example 4 (devoid of a light absorber) was used as a composition for preparing the first prism pattern layer in step 2, thereby preparing an optical sheet.

Application Example to a Display Device

In a liquid crystal display device (55-inch LED direct type, 220 V, LG Electronics), the optical film (reflective polarizing film, prism sheet, and the like) located on the rear side of the liquid crystal display panel was removed, and the optical sheet was placed there.

Test Example 1

The optical sheet was applied to a display device. A spectroradiometer (SR-3, TOPCON, working distance: 660 mm, field spec.: 0.2D) was used to measure luminance, CIE 1931 chromaticity coordinates xy, and CIE 1976 chromaticity coordinates u'v'. Then, the area of color gamut and DCI overlapping ratio were calculated therefrom.
In addition, the color was observed from the front and at an angle of 60° of the display device, and Δu'v'(60D) was calculated according to the following equation and is shown in the table below.

$$\Delta u'v'(60D)=[(u'0-u'60)^2+(v'0-v'60)^2]^{1/2}$$

In the above equation, u'0 and u'60 are CIE 1976 chromaticity coordinates u' values measured at the front and at an angle of 60° of the display device, respectively, and v'0 and v'60 are CIE 1976 chromaticity coordinate v' values measured at the front and at an angle of 60° of the display device, respectively.
In addition, the color was observed from the front and at an angle of −60° of the display device in the same manner, and Δu'v'(−60D) was calculated. The results are shown in the table below.

TABLE 1

| | | C. Ex. 1 | Ex. 5 | Ex. 6 | Ex. 7 |
|---|---|---|---|---|---|
| Layer configuration | Second prism sheet | ○ | ○ | ○ | ○ |
| | First prism sheet | | 0.02 part by weight of light absorber | 0.03 part by weight of light absorber | 0.04 part by weight of light absorber |
| | Light-absorbing coating layer | 0.05 part by weight of light absorber | x | x | x |
| | First light diffusion layer | ○ | ○ | ○ | ○ |
| Test result | Luminance (cd/m²) | 257.2 | 277.3 | 264.6 | 253.8 |
| | color x | 0.2647 | 0.2624 | 0.2577 | 0.2538 |
| | color y | 0.2708 | 0.2701 | 0.2647 | 0.2593 |
| | gain | 100.0% | 107.8% | 102.9% | 98.7% |
| | Δx | 0.0000 | −0.0023 | −0.0070 | −0.0109 |
| | Δy | 0.0000 | −0.0007 | −0.0061 | −0.0115 |
| | Peak point | −5 | −5 | 0 | 0 |
| | Left and right viewing angle | 52.7° | 50.4° | 50.3° | 50.4° |
| | Spectrum luminance | 100.0% | 107.1% | 101.8% | 97.9% |

TABLE 1-continued

|  | C. Ex. 1 | Ex. 5 | Ex. 6 | Ex. 7 |
|---|---|---|---|---|
| Area ratio | 89.4% | 90.6% | 92.7% | 94.3% |
| DCI overlapping ratio | 90.8% | 91.6% | 92.6% | 93.7% |
| Δu'v'(60D) | 0.0077 | 0.0065 | 0.0066 | 0.0057 |
| Δu'v'(−60D) | 0.0153 | 0.0095 | 0.0077 | 0.0067 |

As shown in the table above, when the optical sheets of Examples 5 to 7 in which the light absorber was appropriately added to the prism pattern layer were applied to a display device, the luminance, viewing angle, and color were excellent as compared with the optical sheet of Comparative Example 1 in which the light-absorbing coating layer was separately formed.

In particular, a step of separately forming a light-absorbing coating layer was required in the optical sheet of Comparative Example 1, whereas the optical sheets of Examples 5 to 7 did not require such a separate step. Thus, the production efficiency may be enhanced. In addition, the display device to which the optical sheets of Examples 5 to 7 were each applied had a small change in chromaticity coordinate values according to the viewing angle as compared with the optical sheet of Comparative Example 1, so that a color deviation according to the viewing angle may be effectively reduced.

Test Example 2

The optical sheets of Example 5 and Comparative Example 2 were placed in a spectrophotometer (CM-3700A, Konica Minolta, light source D65), and the transmission spectra were measured, respectively. The results are shown in FIG. 13.

Figure 13:
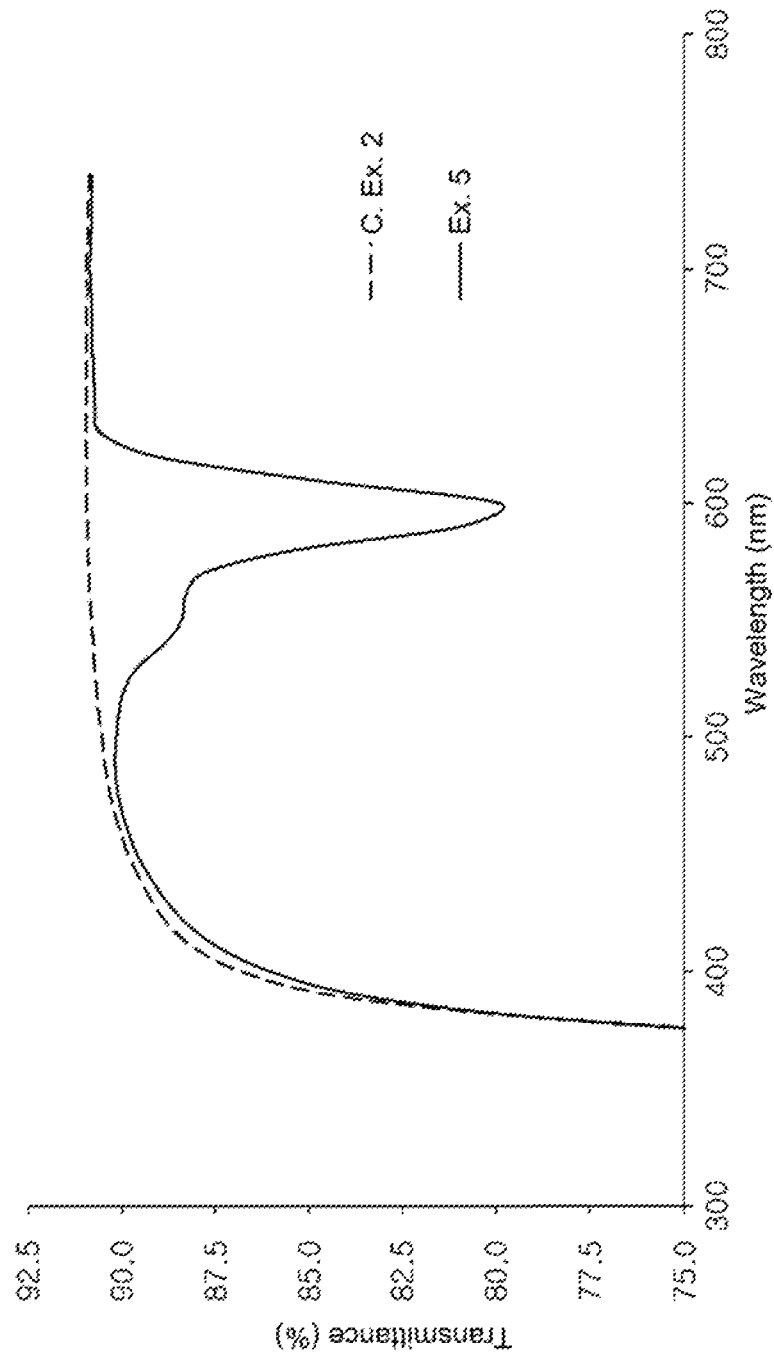
FIG. 13 shows transmission spectra of the optical sheets of Example 5 and Comparative Example 2.

As shown in FIG. 13, the transmission spectral curve of Comparative Example 2 in which an organic dye was not added to the prism pattern appeared flat at all wavelengths in the visible light band.

In contrast, the transmission spectral curve of Example 5 showed a narrow and deep valley at a specific wavelength in the visible light band. As a result, it was confirmed that the optical sheet of Example 5 selectively absorbed light of a specific wavelength by an organic dye.

It is difficult to achieve this selective absorption characteristic for the light of a specific wavelength if a pigment or phosphor other than an organic dye is used as the light absorber. Since the organic dye was uniformly dissolved in a solvent and added to the prism pattern in Example 5, the wavelength absorption selectivity could be very excellent. Since it hardly absorbed other wavelengths, the decrease in luminance could be minimized. On the other hand, if a pigment or phosphor is used as the light absorber, it is dispersed in a solvent without being dissolved. Thus, the absorption selectivity for a specific wavelength is poor, and it is not suitable for use in enhancing the color gamut.

Figure 14:
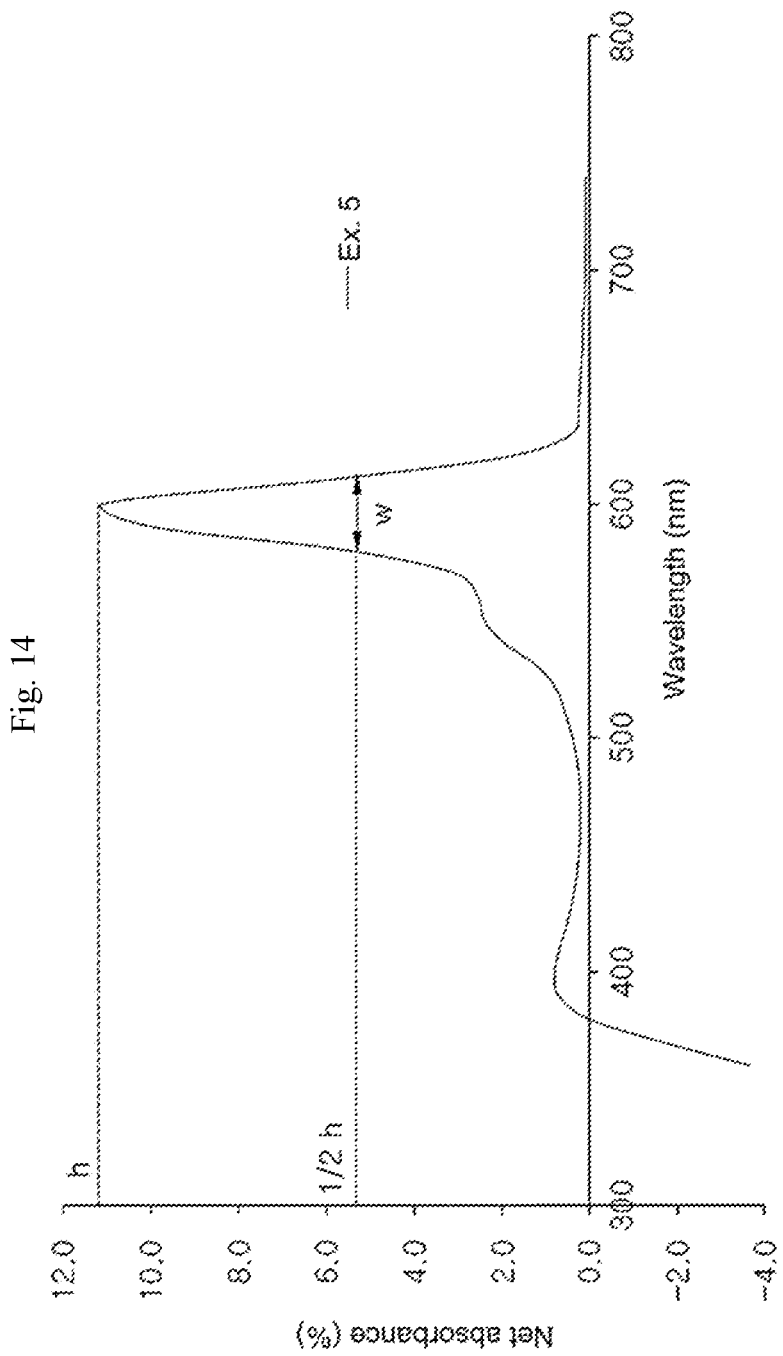
FIG. 14 shows the net absorbance spectrum of the optical sheet of Example 5.

FIG. 14 shows a value obtained by subtracting the transmittance of Example 5 from the transmittance of Comparative Example 2 with respect to wavelength, that is, a net absorbance by an organic dye, which is shown as a spectral curve. In FIG. 14, the maximum height (h) of the peak (sharp peak) of the net absorbance is about 11%, the height (½ h) corresponding to half thereof is about 5.5%, and the peak width at that height (w), that is, the full width at half maximum (FWHM) was measured to be about 32 nm. As described above, since the full width at half maximum of the peak was very narrow as 50 nm or less in the net absorbance spectrum of Example 5, it was confirmed that the absorption selectivity of wavelength was very high.

The invention claimed is:

1. An optical sheet, which comprises a base layer; and a prism sheet comprising a prism pattern layer disposed on the base layer,
wherein the prism pattern layer comprises a light absorber that selectively absorbs light in a specific wavelength band, and the light absorber comprises at least one organic dye,
wherein the prism pattern layer further includes a UV blocking agent, an antioxidant, and a light stabilizer, and
wherein a weight of the UV blocking agent included in the prism pattern layer is 10 to 100 times a weight of the light absorber, a weight of the antioxidant included in the prism pattern layer is 1 to 10 times the weight of the light absorber, and a weight of the light stabilizer included in the prism pattern layer is 10 to 50 times the weight of the light absorber.

2. The optical sheet of claim 1, wherein the light absorber is included in an amount of 0.01% by weight to 1% by weight based on a total weight of the prism pattern layer,
the light absorber comprises one or more organic dye selected from the group consisting of pyrrolemethines, rhodamines, borondipyrromethenes, tetraazaporphyrins, squarines, and cyanines, and
the prism pattern layer has a transmittance of 10% to 70% for UV-A light.

3. The optical sheet of claim 1, which satisfies the following Inequation (1):

$$\text{FWHM} \leq 50 \text{ nm} \quad (1)$$

in Inequation (1), FWHM is a full width at half maximum (nm) of a maximum peak in a spectral curve of net absorbance with respect to wavelength, said net absorbance is obtained by subtracting a first transmittance (T1) from a second transmittance (T0),
wherein the first transmittance (T1) is a transmittance of the optical sheet, and
the second transmittance (T0) is a transmittance of a reference sheet that is same as the optical sheet except for omission of the light absorber.

4. The optical sheet of claim 1, wherein
the UV blocking agent is one or more selected from the group consisting of hydroxybenzotriazole-based, tris-resorcinol-triazine chromophore-based, and hydroxyphenyl-benzotriazole chromophore-based UV blocking agents,
the antioxidant is one or more selected from the group consisting of amine-based, phenol-based, sulfur-based, phosphine-based, phosphite-based, and thioester-based antioxidants, and the light stabilizer is one or more selected from the group consisting of a hindered amine light stabilizer (HALS)-based, benzotriazole-based, and benzophenol-based light stabilizer.

5. The optical sheet of claim 1, which further comprises a functional coating layer disposed under the prism sheet, wherein the functional coating layer is selected from the group consisting of a light diffusion layer, a grinding prevention layer, and a heat-resistant coating layer.

6. The optical sheet of claim 1, which comprises a first prism sheet; and a second prism sheet disposed on the first prism sheet,
wherein the first prism sheet comprises a first base layer and a first prism pattern layer disposed on the first base layer,
the second prism sheet comprises a second base layer and a second prism pattern layer disposed on the second base layer,
the first prism pattern layer extends in a first direction in a plane,
the second prism pattern layer extends in a second direction in a plane that intersects with the first direction,
at least one of the first prism pattern layer and the second prism pattern layer comprises a light absorber that selectively absorbs light in a specific wavelength band, and the light absorber comprises one or more organic dyes.

7. The optical sheet of claim 6, which further comprises a first functional coating layer disposed under the first prism sheet; and a second functional coating layer disposed on the second prism sheet,
wherein the first functional coating layer and the second functional coating layer are each selected from the group consisting of a light diffusion layer, a grinding prevention layer, a heat-resistant coating layer, and a hard coating layer, and
the first functional coating layer, the first prism sheet, the second prism sheet, and the second functional coating layer are directly or indirectly combined with each other.

8. The optical sheet of claim 7, which further comprises a reflective polarizing film interposed between the second prism sheet and the second functional coating layer; and
a cushioning film interposed between the second prism sheet and the reflective polarizing film,
wherein the reflective polarizing film has a structure in which a first resin layer and a second resin layer having different optical properties are alternately laminated in 100 to 2,000 layers.

9. An optical sheet, which comprises a base layer; a prism sheet comprising a prism pattern layer disposed on the base layer; and a light diffusion layer disposed under the prism sheet,
wherein the prism pattern layer comprises a light absorber that selectively absorbs light in a specific wavelength band,
wherein the prism pattern layer further includes a UV blocking agent, an antioxidant, and a light stabilizer, and
wherein a weight of the UV blocking agent included in the prism pattern layer is 10 to 100 times a weight of the light absorber, a weight of the antioxidant included in the prism pattern layer is 1 to 10 times the weight of the light absorber, and a weight of the light stabilizer included in the prism pattern layer is 10 to 50 times the weight of the light absorber.

10. The optical sheet of claim 9, wherein the light absorber is included in an amount of 0.01% by weight to 1% by weight based on a total weight of the prism pattern layer, and the light absorber comprises at least one organic dye.

11. A process for preparing the optical sheet of claim 1, which comprises coating a composition for forming a prism pattern on the upper side of a base layer, transferring a pattern, and then UV curing the composition to form a prism pattern layer,
wherein the composition for forming a prism pattern comprises a binder resin, a light absorber, a UV blocking agent, an antioxidant, and a light stabilizer,
wherein the light absorber comprises at least one organic dye that selectively absorbs light in a specific wavelength band, and
wherein a weight of the UV blocking agent included in the prism pattern layer is 10 to 100 times a weight of the light absorber, a weight of the antioxidant included in the prism pattern layer is 1 to 10 times the weight of the light absorber, and a weight of the light stabilizer included in the prism pattern layer is 10 to 50 times the weight of the light absorber.

12. The process of claim 11, wherein the composition for forming a prism pattern comprises 0.01 to 1 part by weight of the light absorber relative to 100 parts by weight of the binder resin.

13. A process for preparing an optical sheet, which comprises:
(1) forming a first functional coating layer on the lower side of a first base layer;
(2) coating a composition for forming a first prism pattern on the upper side of the first base layer, transferring a pattern, and then UV curing the composition to form a first prism pattern layer, and, at the same time, laminating a second base layer on the upper side of the first prism pattern layer; and
(3) forming a second prism pattern layer on the upper side of the second base layer,
wherein the composition for forming a first prism pattern comprises a binder resin, a light absorber, a UV blocking agent, an antioxidant, and a light stabilizer, the light absorber comprises at least one organic dye that selectively absorbs light in a specific wavelength band, and
wherein a weight of the UV blocking agent included in the prism pattern layer is 10 to 100 times a weight of the light absorber, a weight of the antioxidant included in the prism pattern layer is 1 to 10 times the weight of the light absorber, and a weight of the light stabilizer included in the prism pattern layer is 10 to 50 times the weight of the light absorber.

14. A display device, which comprises a light source; a display panel that receives light from the light source and displays an image; and the optical sheet of claim 1 disposed in an optical path from the light source to the display panel.

15. The display device of claim 14, which has a DCI overlapping ratio of 90% or more in the CIE 1976 chromaticity coordinates u'v', and a luminance of 250 cd/m$^2$ or more for white light.

* * * * *